(12) United States Patent
Louison et al.

(10) Patent No.: US 11,484,823 B2
(45) Date of Patent: Nov. 1, 2022

(54) AIR FLOW CONDITIONING DEVICE

(71) Applicant: Cummins Filtration IP, Inc., Columbus, IN (US)

(72) Inventors: Matthew Louison, McFarland, WI (US); John C. Lukasavitz, Flushing, MI (US); Dane P. Miller, Madison, WI (US)

(73) Assignee: Cummins Filtration IP. Inc., Columbus, IN (US)

( * ) Notice: Subject to any disclaimer, the term of this patent is extended or adjusted under 35 U.S.C. 154(b) by 141 days.

(21) Appl. No.: 16/342,265

(22) PCT Filed: Oct. 3, 2017

(86) PCT No.: PCT/US2017/054902
§ 371 (c)(1),
(2) Date: Apr. 16, 2019

(87) PCT Pub. No.: WO2018/075234
PCT Pub. Date: Apr. 26, 2018

(65) Prior Publication Data
US 2019/0321764 A1  Oct. 24, 2019

Related U.S. Application Data

(60) Provisional application No. 62/410,636, filed on Oct. 20, 2016.

(51) Int. Cl.
*B01D 46/00* (2022.01)
*B01D 46/44* (2006.01)
(Continued)

(52) U.S. Cl.
CPC ..... *B01D 46/0049* (2013.01); *B01D 46/0005* (2013.01); *B01D 46/444* (2013.01);
(Continued)

(58) Field of Classification Search
CPC ............ B01D 46/0049; B01D 46/0005; B01D 46/0023; B01D 46/444; B01D 46/521;
(Continued)

(56) References Cited

U.S. PATENT DOCUMENTS 4,909,815 A    3/1990  Meyer
5,354,460 A   10/1994  Kearney et al.
(Continued)

FOREIGN PATENT DOCUMENTS

DE    20 2006 004 927 U1    9/2007
DE    10 2014 200 654 A1    8/2014
(Continued)

OTHER PUBLICATIONS

International Search Report and Written Opinion Issued for PCT/US2015/025582, dated Jul. 2, 2015, 8 Pages.
(Continued)

*Primary Examiner* — Robert A Hopkins
*Assistant Examiner* — Qianping He
(74) *Attorney, Agent, or Firm* — Foley & Lardner LLP

(57) ABSTRACT

A filter assembly includes a support fame, a filter media, and a conditioning device. The filter media is coupled to the support frame. The filter media has a dirty side that receives an air stream and a clean side that outputs the air stream after having been filtered by the filter media. The conditioning device is coupled to the support frame. The conditioning device is positioned downstream of the clean side of the filter media with respect to the air stream and directly contacts the clean side of the filter media.

17 Claims, 21 Drawing Sheets

(51) Int. Cl.
  *B01D 46/52* (2006.01)
  *F02M 35/024* (2006.01)
  *F02M 35/02* (2006.01)
  *B01D 46/62* (2022.01)

(52) U.S. Cl.
  CPC ........... *B01D 46/521* (2013.01); *B01D 46/62* (2022.01); *F02M 35/0216* (2013.01); *F02M 35/0245* (2013.01); *F02M 35/02416* (2013.01); *F02M 35/02433* (2013.01); *F02M 35/02466* (2013.01); *F02M 35/02491* (2013.01); *B01D 2279/60* (2013.01)

(58) Field of Classification Search
  CPC .... B01D 2279/60; B01D 46/00; B01D 46/44; B01D 46/52; F02M 35/0216; F02M 35/02416; F02M 35/02433; F02M 35/0245; F02M 35/02466; F02M 35/02491; F02M 35/02; F02M 35/024
  USPC .......................................................... 96/273
  See application file for complete search history.

(56) References Cited

U.S. PATENT DOCUMENTS

| | | | |
|---|---|---|---|
| 5,573,811 | A | 11/1996 | Townsley |
| 5,631,415 | A | 5/1997 | Igarashi et al. |
| 6,047,903 | A | 4/2000 | Meyer |
| 6,112,590 | A | 9/2000 | Rilling |
| 6,145,544 | A * | 11/2000 | Dutertre ............ F16L 55/02718 138/39 |
| 6,156,089 | A | 12/2000 | Stemmer et al. |
| 6,199,434 | B1 | 3/2001 | Cornil et al. |
| 6,464,761 | B1 * | 10/2002 | Bugli ................... F02M 35/024 123/198 E |
| 6,736,871 | B1 | 5/2004 | Green et al. |
| 6,764,533 | B2 | 7/2004 | Lobiondo, Jr. |
| 7,097,694 | B1 | 8/2006 | Jaroszczyk et al. |
| 7,294,179 | B2 | 11/2007 | Kim et al. |
| 7,531,029 | B2 | 5/2009 | Hoke et al. |
| 8,062,403 | B2 | 11/2011 | Goode |
| 9,827,524 | B2 | 11/2017 | Lukasavitz |
| 10,507,417 | B2 | 12/2019 | Li et al. |
| 2004/0055570 | A1 | 3/2004 | Bielicki et al. |
| 2004/0255660 | A1 | 12/2004 | Abdolhosseini et al. |
| 2006/0180389 | A1 | 8/2006 | Cheng et al. |
| 2006/0272508 | A1 * | 12/2006 | Hoke ................. B01D 53/0415 96/134 |
| 2007/0297285 | A1 | 12/2007 | Cross et al. |
| 2009/0120046 | A1 | 5/2009 | Huff |
| 2010/0018397 | A1 * | 1/2010 | Ishibe .................... B01D 63/12 96/9 |
| 2010/0186353 | A1 | 7/2010 | Ackermann et al. |
| 2010/0269583 | A1 * | 10/2010 | Jasnie .............. F02M 35/10013 73/198 |
| 2013/0160651 | A1 | 6/2013 | Mani |
| 2019/0381442 | A1 * | 12/2019 | Li ........................ B01D 46/522 |

FOREIGN PATENT DOCUMENTS

| | | |
|---|---|---|
| JP | 2010-138755 A | 6/2010 |
| WO | WO 2015/160709 A1 | 10/2015 |

OTHER PUBLICATIONS

International Search Report and Written Opinion issued for PCT/US2017/054902, dated Dec. 11, 2017, 16 pages.
Office Action issued for U.S. Appl. No. 15/304,322, dated Jan. 11, 2019, 14 pages.
Final Office Action for U.S. Appl. No. 15/304,322 dated May 21, 2019, 13 pages.
ISO 5167-6 "Measurement of fluid flow by means of pressure differential devices inserted in circular cross-section conduits running full—Part 6: Wedge meters," International Organization for Standardization, 20 pages (2019).
Office Action issued for U.S. Appl. No. 16/552,409 dated Apr. 26, 2021, 19 pages.
Office Action issued for German Patent Application No. DE 112015001846.8 dated Mar. 3, 2022.

* cited by examiner

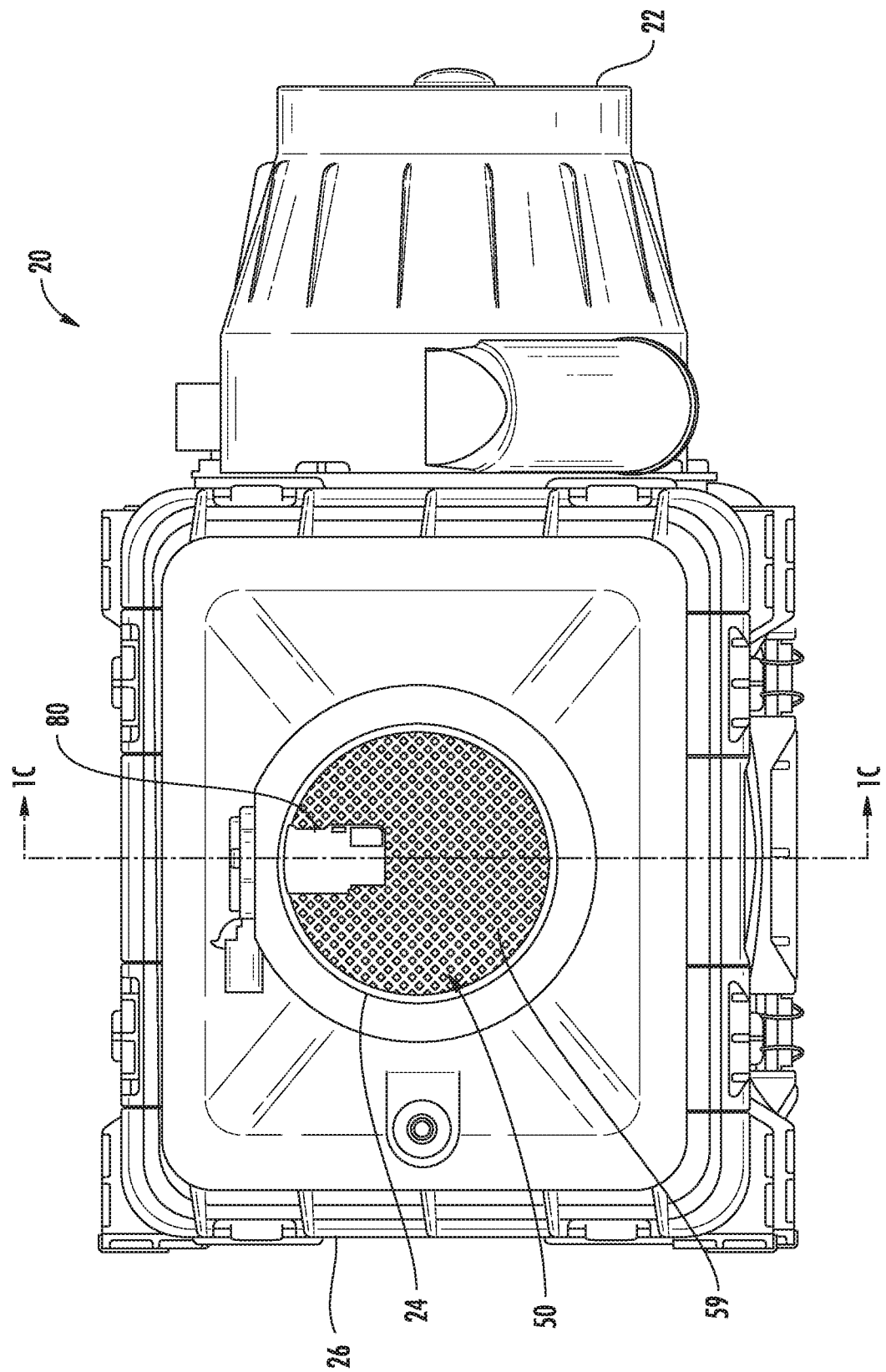

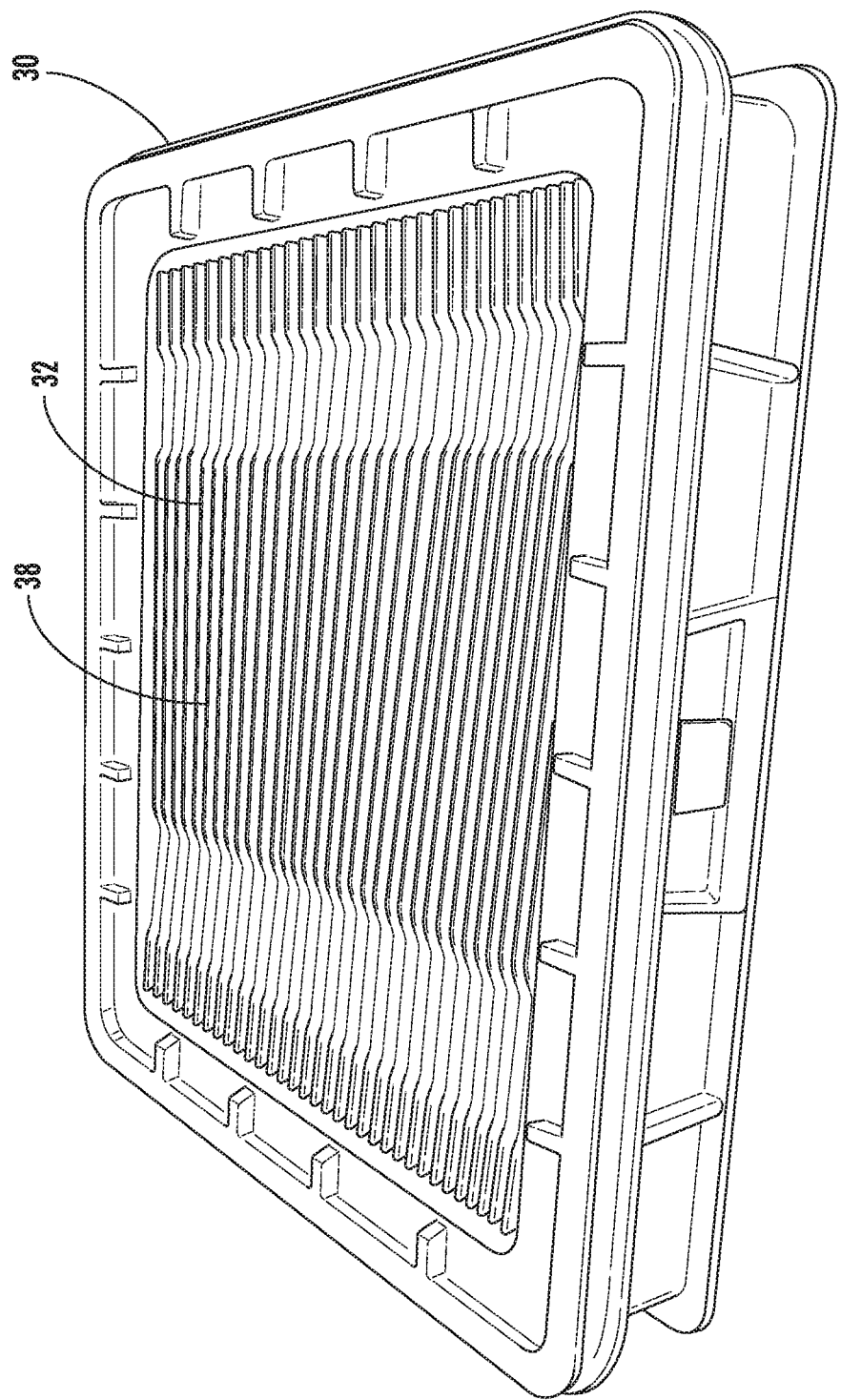

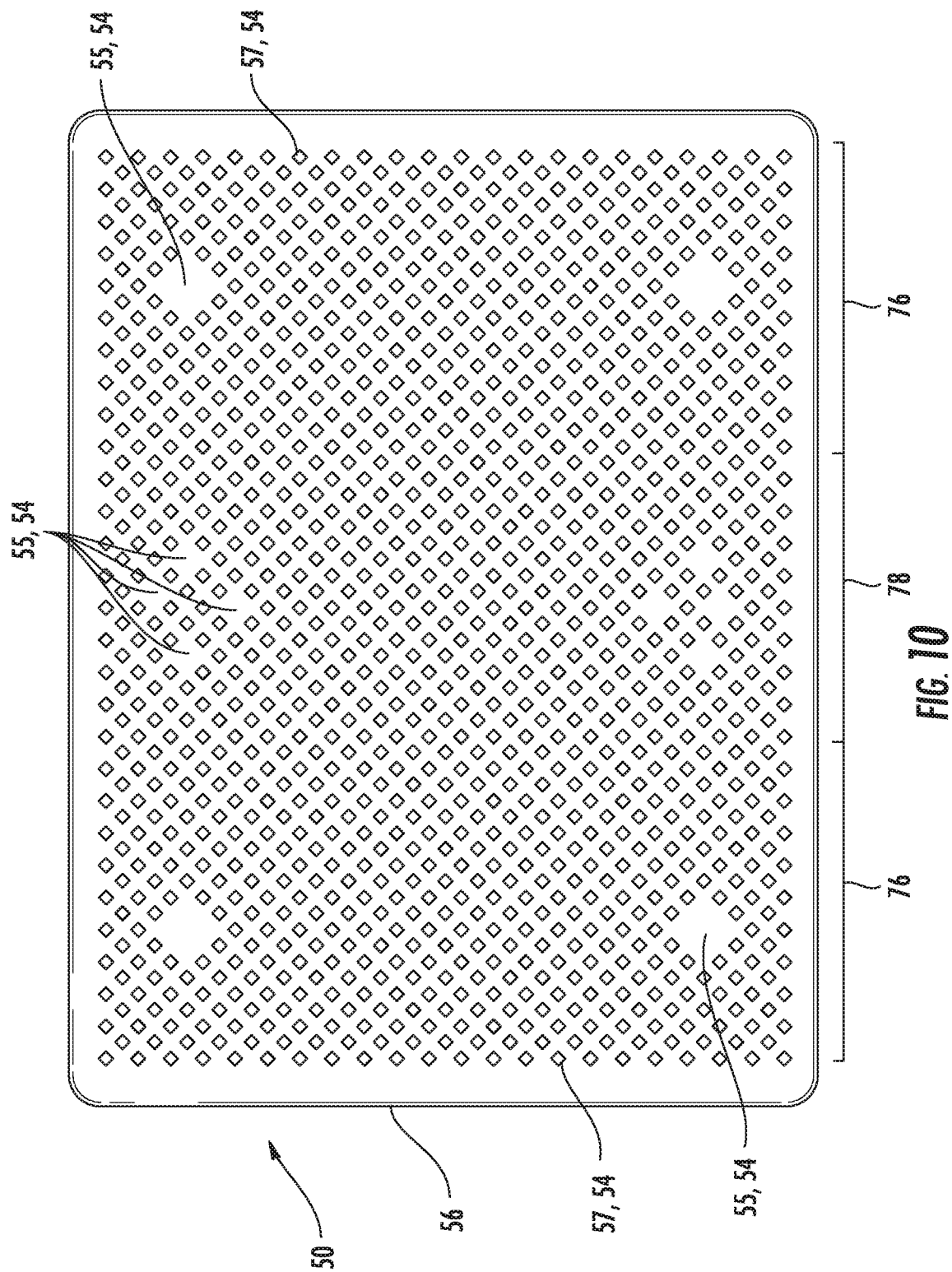

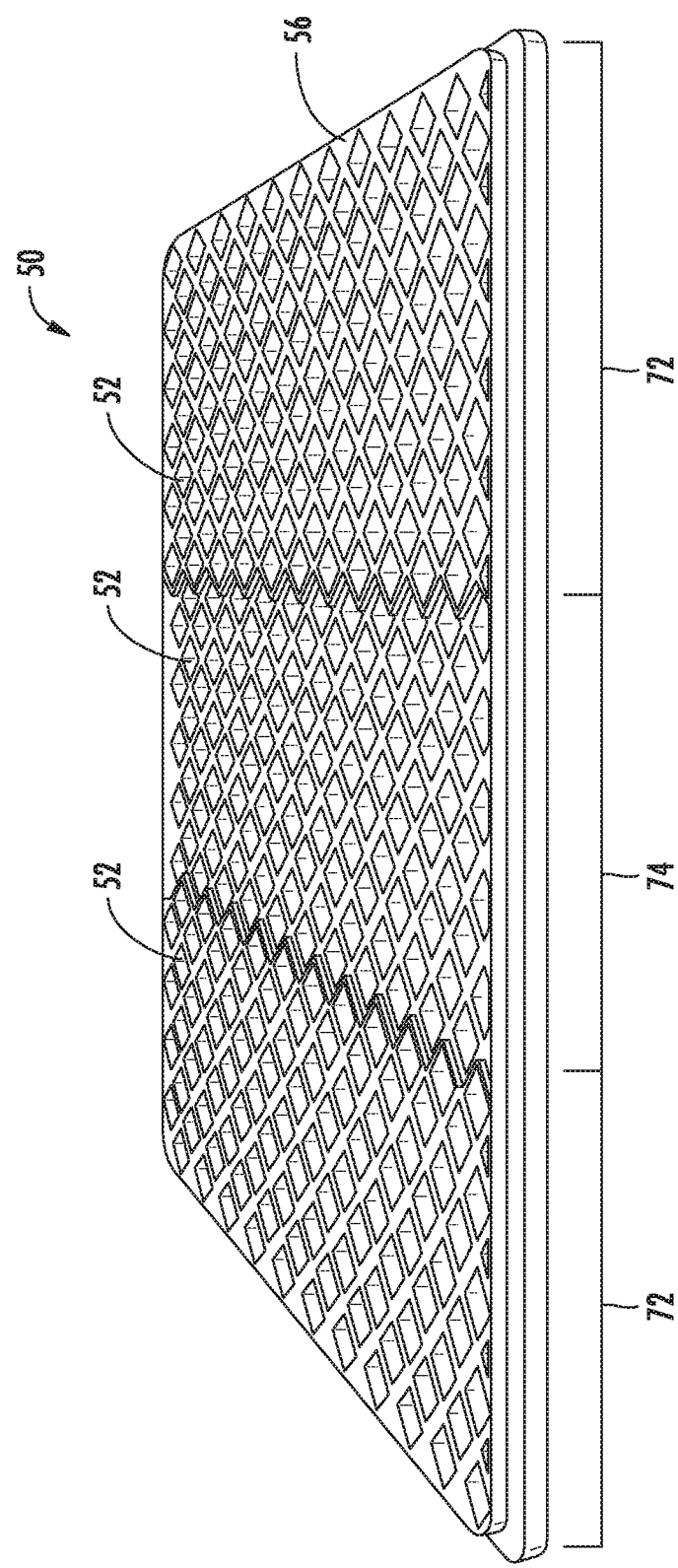

AIR FLOW CONDITIONING DEVICE

CROSS REFERENCE TO RELATED APPLICATIONS

This application is a national stage of PCT Application No. PCT/US2017/054909, filed Oct. 3, 2017 which claims priority to and the benefit of U.S. Provisional Patent Application No. 62/410,636, filed Oct. 20, 2016. The contents of both applications are incorporated herein by reference in their entirety.

FIELD

The present invention relates generally to filter assemblies for use with internal combustion engine systems or the like.

BACKGROUND

Internal combustion engines generally combust a mixture of fuel (e.g., gasoline, diesel, natural gas, etc.) and air. Prior to entering the engine, the air is typically passed through an air filter assembly to be filtered by an air filter media. A mass air flow (MAF) sensor is placed downstream of the filter media (i.e., on the clean side of the filter media) and provides feedback regarding the air stream to an engine control module (ECM). The MAF sensor is configured to measure the mass of air flowing past it, which relates to the velocity of the air.

As an air stream passes through the filter media, the air stream is disrupted, which causes the quality of the exit air flow from the filter media (e.g., the air stream exiting the filter media) to be inconsistent. The degree of flow disruption is highly dependent on geometry of filter media pleats of the filter media.

Flow disruptions in the exit air flow may be caused by a variety of different factors. For example, inconsistencies in the filter media (caused by, for example, orientation effects and/or deformation from water soak) may disrupt the air stream. Additionally, random stream-wise orientations of filter media pleats of the filter media may cause the exit air flow to point directly at the MAF sensor window or cause the exit air flow to point away from the MAF sensor window. The flow disruptions in exit air flow may also be caused by variations in the shape and/or spacing of the filter media pleats and different pleat counts.

Flow disruptions in the exit air flow may also be caused by variations in the positions of embossments on the filter media pleats. Embossments on the filter media pleats may act as spacers between the individual media pleats. However, the embossments may not be precisely and repetitively positioned on the filter media pleats relative to the filter frame that holds the filter media. For example, some of the embossments may be closer to the edges of the filter frame and other embossments may be further away from the edges of the filter frame. The variations in embossments may cause flow disruptions in the exit air flow. The embossments may also block the air stream from flowing between filter media pleats. Thus, the presence of embossments creates a flow-around-bluff-body situation, which may create flow structures that include, but are not limited to, vortices, eddies, and bubbles. These flow structures cause the exit air flow to have inconsistencies.

The flow disruptions in the exit air flow translate any part-to-part variation of geometry of the filter media to any MAF sensors downstream of the filter media. Since the MAF sensors are particularly sensitive to slight variations, disruptions, and inconsistencies in exit air flow, the flow disruptions cause the signal response of MAF sensor to be highly variable, reduce the signal quality of the MAF sensor output, and result in inconsistent and/or inaccurate outputs from the MAF sensors to an ECM or other devices.

In attempt to condition the exit air flow from the filter media before reaching a MAF sensor, a foam media, such as oiled foam media or dry foam media, may be used within a filter assembly. For example, such a secondary filter media may be constructed out of foam or a foam media may be added to the secondary filter media. However, foam media may have a high pressure drop (and therefore may be too restrictive), has a limited dust-holding capacity, may have high manufacturing variability, is sensitive to variation in air flow, may cost more than typical cellulose media grade, and may have reliability issues or the potential to degrade or fail in certain environmental conditions, such as prolonged exposure to high humidity.

Alternatively, a separate flow conditioning device may be added to the air filter assembly downstream of the filter media in attempt to condition the exit air flow from the filter media. However, adding a flow conditioning device that is a separate part can be expensive and may have implementation and packaging issues due to the required space for positioning the separate flow conditioning device after the air filter and before the MAF sensor.

Some configurations of filter assemblies use larger obstructions, such as several washers or rings, positioned along the air flow path in attempt to condition the exit air flow. However, this configuration of washers may be difficult to implement and has limited success. Furthermore, the washers may also cause MAF signal noise issues.

Other configurations of filter assemblies may add either mesh (such as a mesh screen) or filter media after the filter media pleats in attempt to condition the exit air flow. However, this configuration of mesh or filter media also has limited success and, furthermore, requires a separation distance or gap between the mesh or media and the filter media of about 0.1 to 100 times the pleat-to-pleat distance (i.e., the pleat tip gap). Additionally, it may be difficult to find filter media that can withstand high media face velocity with low restriction if not properly supported downstream.

SUMMARY

Various embodiments provide for a filter assembly that includes a support frame, a filter media, and a conditioning device. The filter media is coupled to the support frame. The filter media has a dirty side that receives an air stream and a clean side that outputs the air stream after having been filtered by the filter media. The conditioning device is coupled to the support frame. The conditioning device is positioned downstream of the clean side of the filter media with respect to the air stream and directly contacts the clean side of the filter media.

Various other embodiments provide for a method of conditioning an air stream passing through a filter assembly. The method comprises passing the air stream through a filter media, and, after passing the air stream through the filter media, passing the air stream through a conditioning device. The conditioning device is coupled to a support frame that is coupled to the filter media. The conditioning device is positioned downstream of the clean side of the filter media with respect to the air stream and directly contacts the clean side of the filter media.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1B is a side view of the filter assembly of FIG. 1A.

FIG. 6A is a cross-sectional view of a filter media, a support frame and a conditioning device according to yet another embodiment an.

FIG. 7B is a perspective view of a clean side of the filter media and the support frame of FIG. 7A.

FIG. 10 is an elevation view of the conditioning device according to another embodiment.

FIG. 11B is a perspective view of the channels of the conditioning device of FIG. 11A.

DETAILED DESCRIPTION

Referring to the figures generally, various embodiments disclosed herein relate to an air flow conditioning device that conditions the exit air flow flowing out of a filter media before flowing into a mass air flow (MAF) sensor within a filter assembly of an air filtration system. By conditioning the exit air flow, the conditioning device reduces or eliminates inconsistencies in the exit air flow, reduces defects in the exit air flow, makes the exit air flow substantially uniform, and improves the quality of the exit air flow. Accordingly, the conditioning device improves the signal quality (e.g., the accuracy and consistency) of the signal output of a flow measurement device, such as the MAF sensor, that is positioned downstream of the filter media.

MAF sensors are highly sensitive to any slight variations in air flow and filter assemblies typically have limited room to condition the air flow for MAF sensors. However, the conditioning device conditions the exit air flow and mitigates unexpected disturbances in the exit air flow caused by the inconsistencies of the filter media within a short distance within the filter assembly and also meets both the pressure drop requirements and the MAF performance requirements in order to obtain quality output, such as more accurate and more consistent signal outputs, from the MAF sensor.

The conditioning device improves the signal output of the MAF sensor in terms of normalized variation, which is defined below by equation 1.

$$\text{Normalized variation} = \frac{dQ}{Q}\% \quad (1)$$

In equation 1, Q is the bench mark flow rate at which the MAF-integrated system is tested and dQ is the twice the standard deviation of flow rates reported by MAF sensors of a group of MAF-integrated applications from bench mark flow rate Q. Better MAF signal performance involves the removal or mitigation of part-to-part variation of the group of MAF-integrated applications. The conditioning device removes or mitigates this variation.

Various example conditioning devices are described, for example, in PCT application PCT/US2015/025582, the contents of which are incorporated by reference herein in its entirety.

Air Filter Assembly

As shown in FIGS. 1A-1D, the air filter assembly 20 is configured to filter fluid such as air. The filter assembly 20 may provide filtered air to a device, such as an internal combustion engine. Although air is referred to herein, it is understood that a variety of different fluids may be filtered by the filter assembly 20, which includes a conditioning device 50.

Figure 1A:
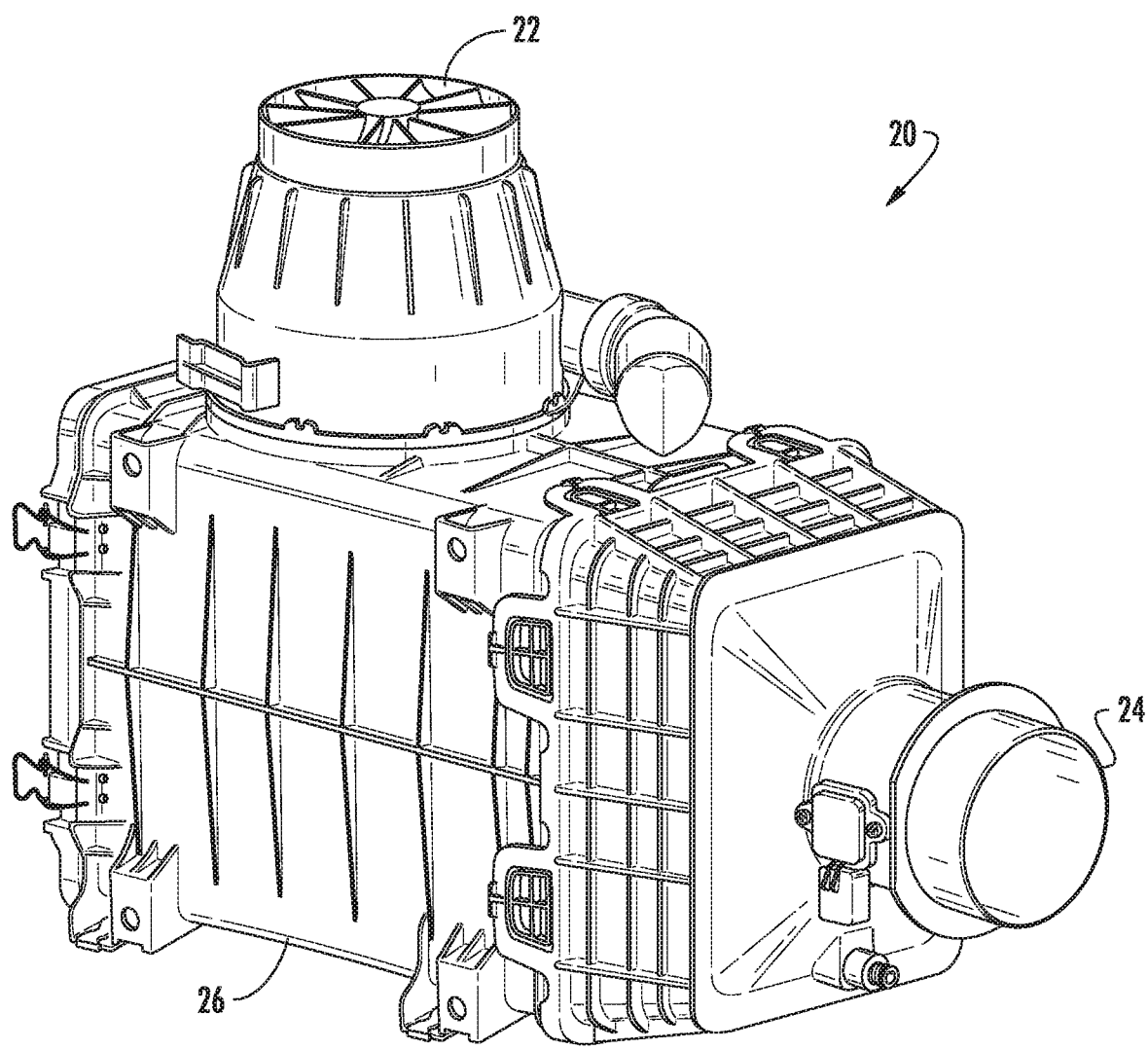
FIG. 1A is a perspective view of a filter assembly according to one embodiment.

As shown in FIGS. 1A-1B, the filter assembly 20 includes a housing 26 with an inlet 22 to allow unfiltered or dirty fluid into the housing 26 and an outlet 24 to allow filtered or clean fluid to exit the housing 26. However, it is understood that the inlet 22 and the outlet 24 can be reversed such that the inlet 22 is an outlet and the outlet 24 is an inlet.

Figure 1C:
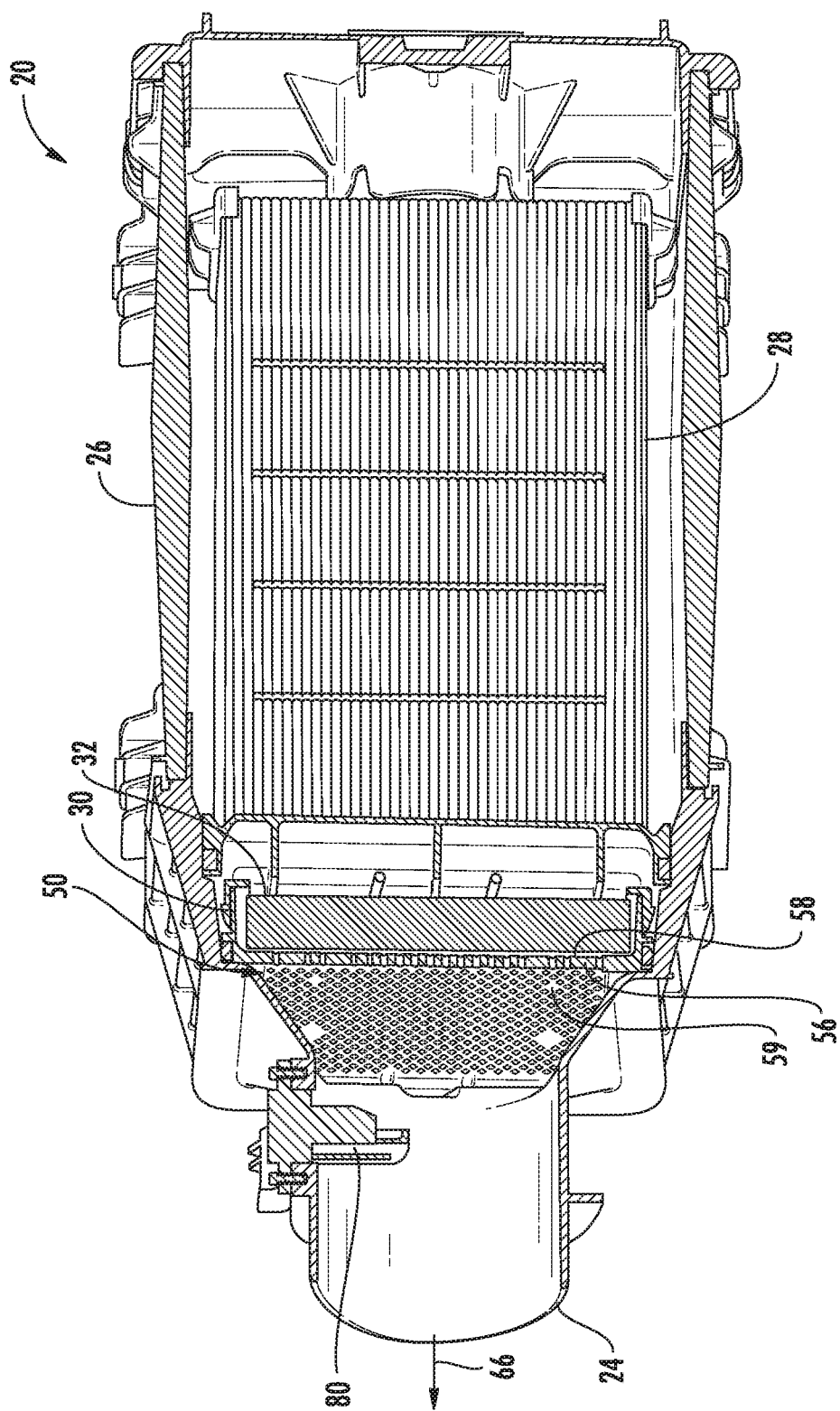
FIG. 1C is a cross-sectional, perspective view of FIG. 1B taken along line 1C-1C.

As shown in FIG. 1C, the housing 26 surrounds and encompasses various components of the filter assembly 20, including but not limited to a primary filter media 28, a secondary filter media 32, the support frame 30, the conditioning device 50, and a MAF sensor 80. Each of the various components of the filter assembly 20 are positioned within the housing 26 along the path of the air stream 60 being filtered. According to one embodiment, the housing 26 may be a Direct Flow™ air filter housing, such as the DF585 series.

Figure 1D:
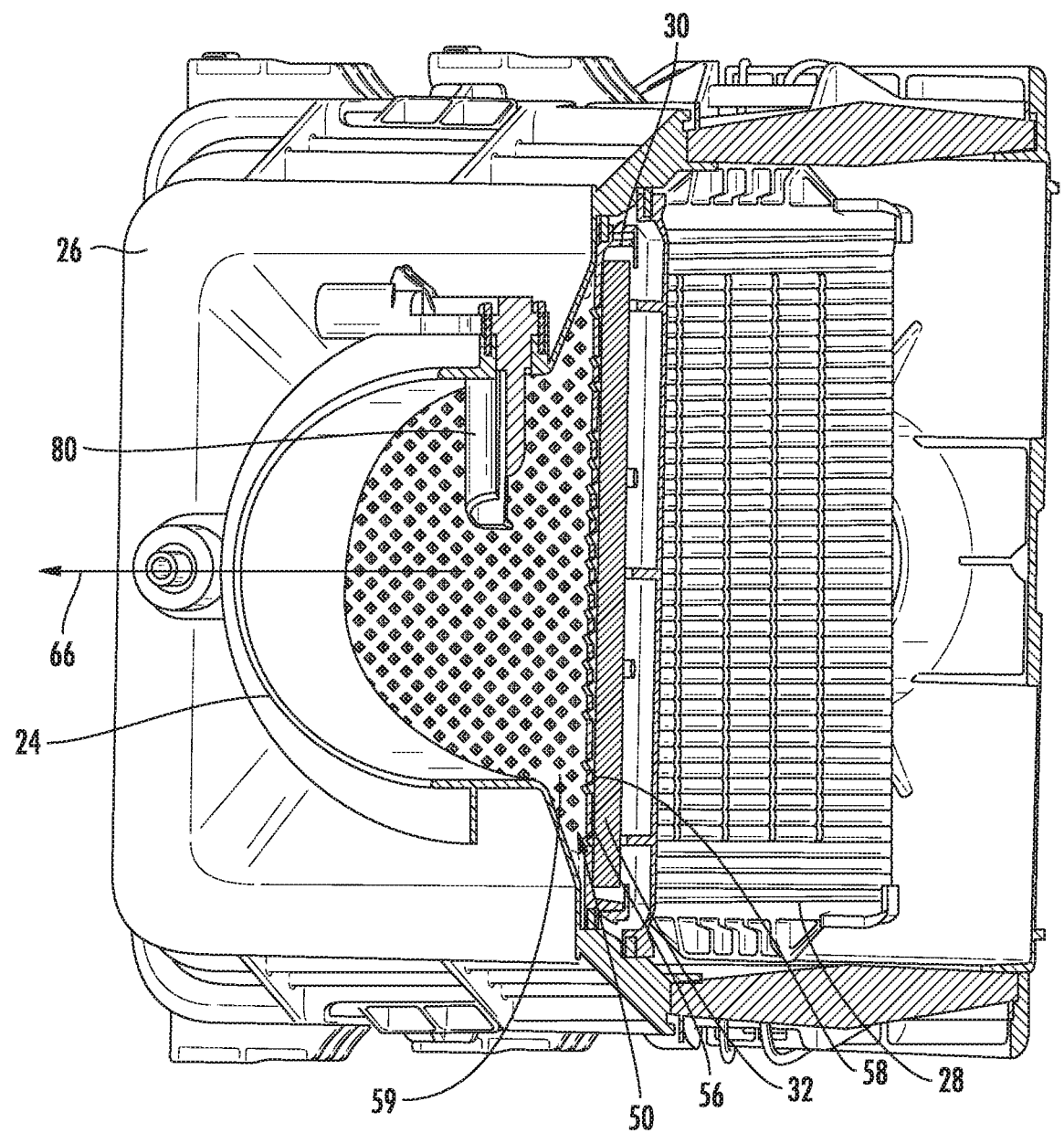
FIG. 1D is an enlarged, cross-sectional, perspective view of FIG. 1B taken along line 1C-1C.

The primary filter media 28 is used to filter the air stream 60 flowing through the filter assembly 20. The secondary filter media 32 is also used to filter the air stream 60 flowing through the filter assembly 20. As shown in FIGS. 1C-1D, the secondary filter media 32 is downstream from the primary filter media 28 along the flow path or air flow direction 66 of the air stream 60. Although the conditioning device 50 is shown and described with the secondary filter media 32, it is understood that the filter assembly 20 may only have one filter media and the conditioning device 50 may be used with the primary filter media 28 in the same or a similar manner that the conditioning device 50 is used with the secondary filter media 32 (as described further herein).

Figure 7A:
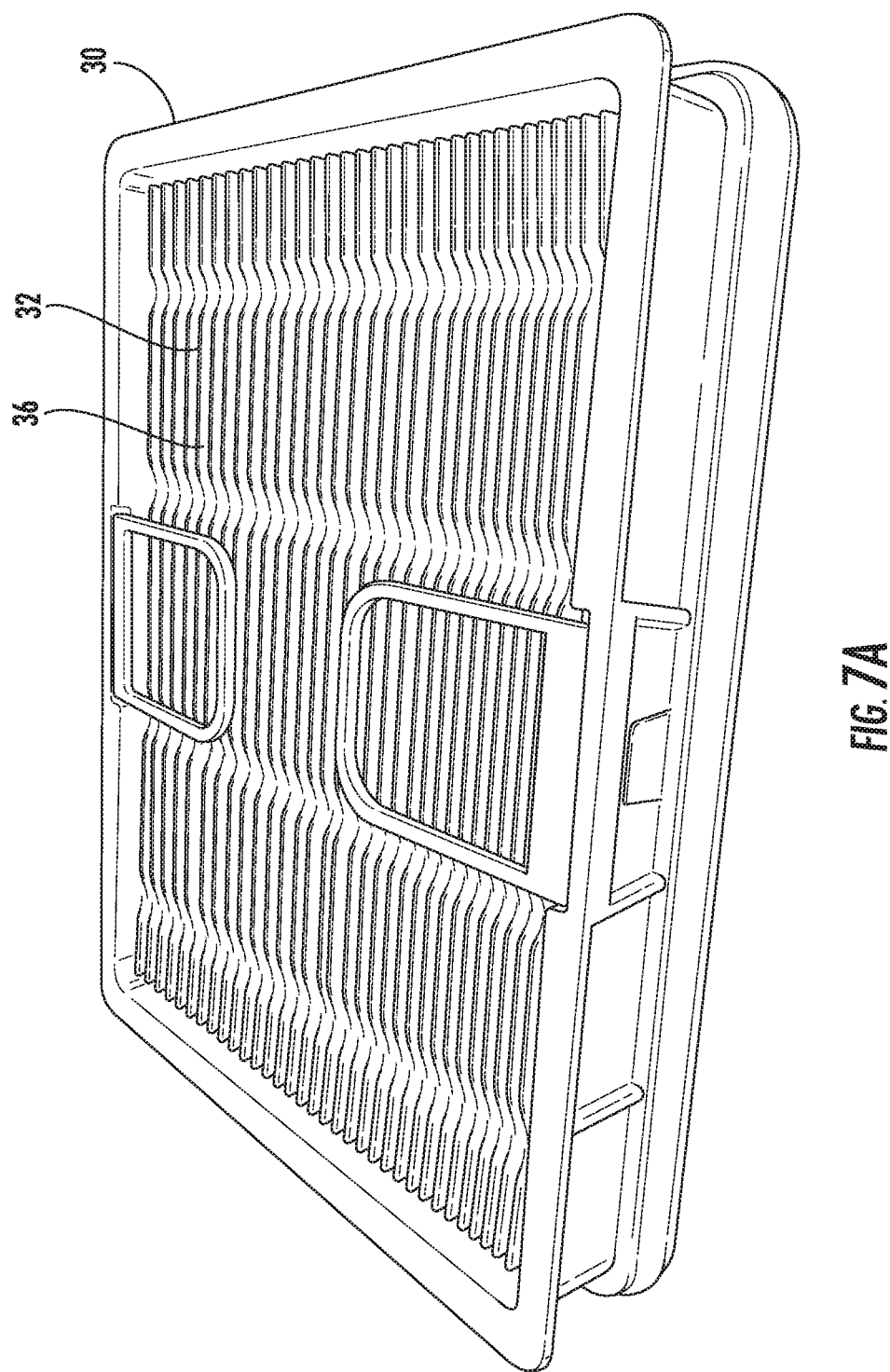
FIG. 7A is a perspective view of a dirty side of a filter media and a support frame according to one embodiment.

The secondary filter media 32 may be constructed out of various fibrous media in order to maintain the integrity of the secondary filter media 32 and to be less restrictive (compared to foam filter media). For example, as shown in FIGS. 7A-7B, the secondary filter media 32 is pleated. However, the pleated secondary filter media 32 causes the air stream 60 flowing through to have inconsistencies and to be non-uniform. Accordingly, as described further herein, the conditioning device 50 is used with the secondary filter media 32 to condition the air stream 60 before flowing into the MAF sensor 80.

As shown in FIGS. 3, 5A, 6A, and 7A-7B, the secondary filter media 32 has a dirty side 36 and a clean side 38 on opposite ends of the secondary filter media 32 along the flow direction 66. The dirty side 36 is upstream of the clean side 38 and is configured to receive the entry air flow 62 of the air stream 60. The clean side 38 is downstream of the dirty side 36 and is configured to output the exit air flow 64 of the air stream 60 that has flowed through (and has been filtered by) the secondary filter media 32. The air stream 60 enters through the dirty side 36 into the secondary filter media 32 as entry air flow 62, is filtered by the secondary filter media 32, exits through the clean side 38 out from the secondary filter media 32 as exit air flow 64, flows through the conditioning device 50, and subsequently flows toward the MAF sensor 80. The entry air flow 62 refers to the air stream 60 that is upstream of the secondary filter media 32 and entering into the secondary filter media 32. The exit air flow 64 refers to the air stream 60 that is downstream of the secondary filter media 32 and exiting out of the secondary filter media 32.

As shown in FIGS. 3, 4, 5A, 6A, and 7A-7B, the secondary filter media 32 is supported or secured by and coupled to an air filter frame, filter panel, secondary frame, or support frame 30. The support frame 30 may surround the sides of the secondary filter media 32 and expose the dirty side 36 and the clean side 38 of the secondary filter media 32.

As shown in the figures, the secondary filter media 32 fits within the inner perimeter of the support frame 30. Accordingly, the secondary filter media 32 and the support frame 30 are statically attached to each other through a variety of different methods, including but not limited to adhesives (e.g., glue), injection molding the secondary filter media 32 and the support frame 30 as one integral structure, or overmolding.

MAF Sensor

The MAF sensor 80 is used to provide a sensor output or a feedback signal regarding the exit air flow 64 of the air stream 60 to an engine control module (ECM) of an internal combustion engine that receives filtered air stream 60 from the filter assembly 20. The sensor output or feedback signal may relate to at least one characteristic (e.g., the mass flow rate) of the exit air flow 64 of the air stream 60 that has been filtered within the filter assembly 20.

As shown in FIGS. 1B-1D and 2, the MAF sensor 80 is positioned within the housing 26 and is located downstream of or after the secondary filter media 32 and the conditioning device 50 with respect to the flow direction 66 of the air stream 60. Accordingly, the conditioning device 50 is positioned between the secondary filter media 32 and the MAF sensor 80 along the flow direction 66 of the air stream 60. The MAF sensor 80 may be positioned near (and before) the outlet 24 of the housing 26.

Accordingly, the air stream 60 flows or is routed through the inlet 22 of the housing 26, through the primary filter media 28, through the secondary filter media 32, and through the conditioning device 50. Subsequently, at least a portion of the air stream 60 flows or is routed through or past the MAF sensor 80. The air stream 60 then flows through the outlet 24 of the housing 26.

Although a MAF sensor 80 is referred to herein, it is understood that the conditioning device 50 may be used with (or the filter assembly 20 may include) other types of sensors or the conditioning device 50 may be used without (or the filter assembly may not include) any sensor.

Air Flow Conditioning Device

Figure 2:
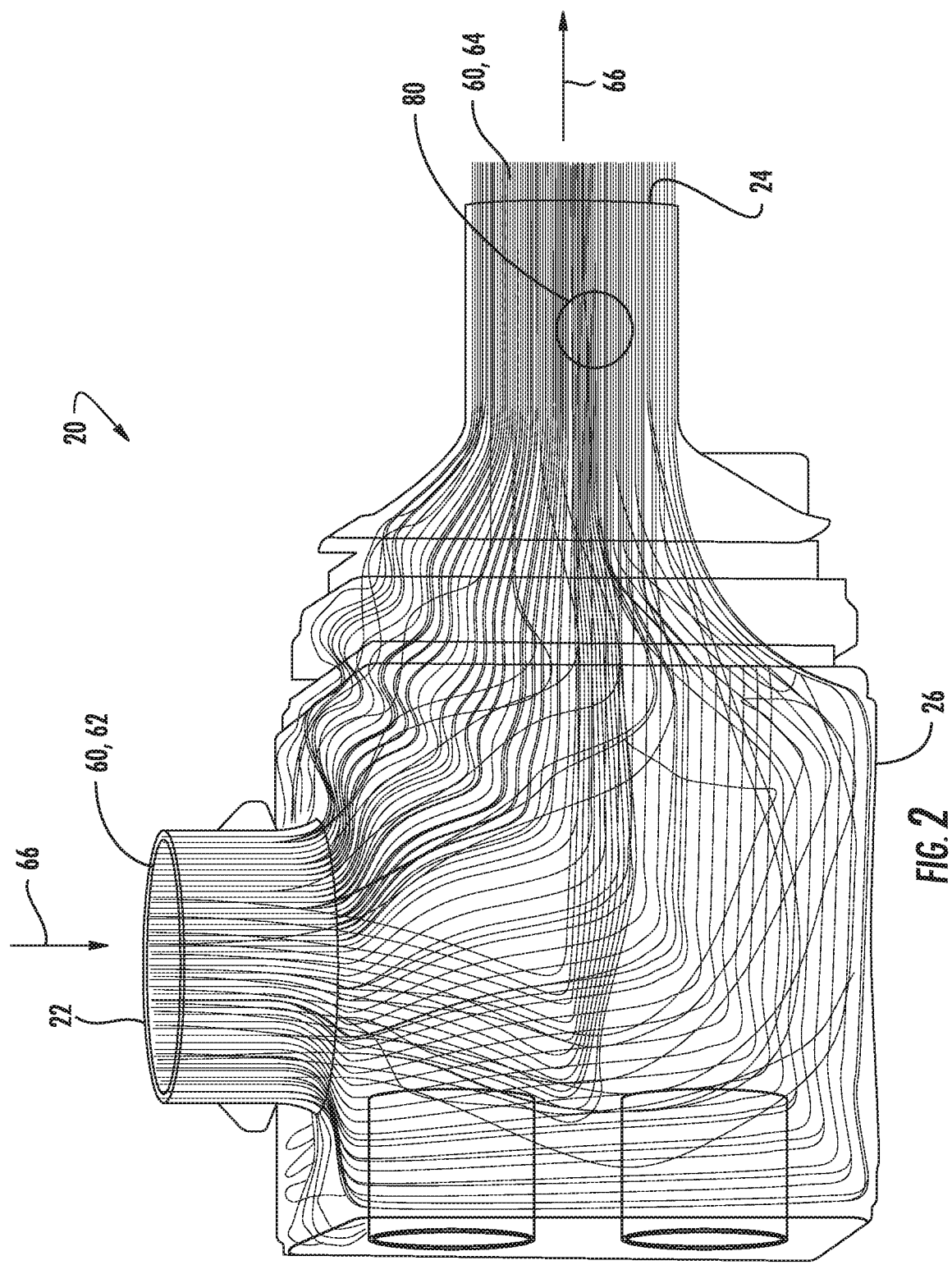
FIG. 2 is a perspective view of a filter assembly according to another embodiment with air flowing through the filter assembly.
Figure 3:
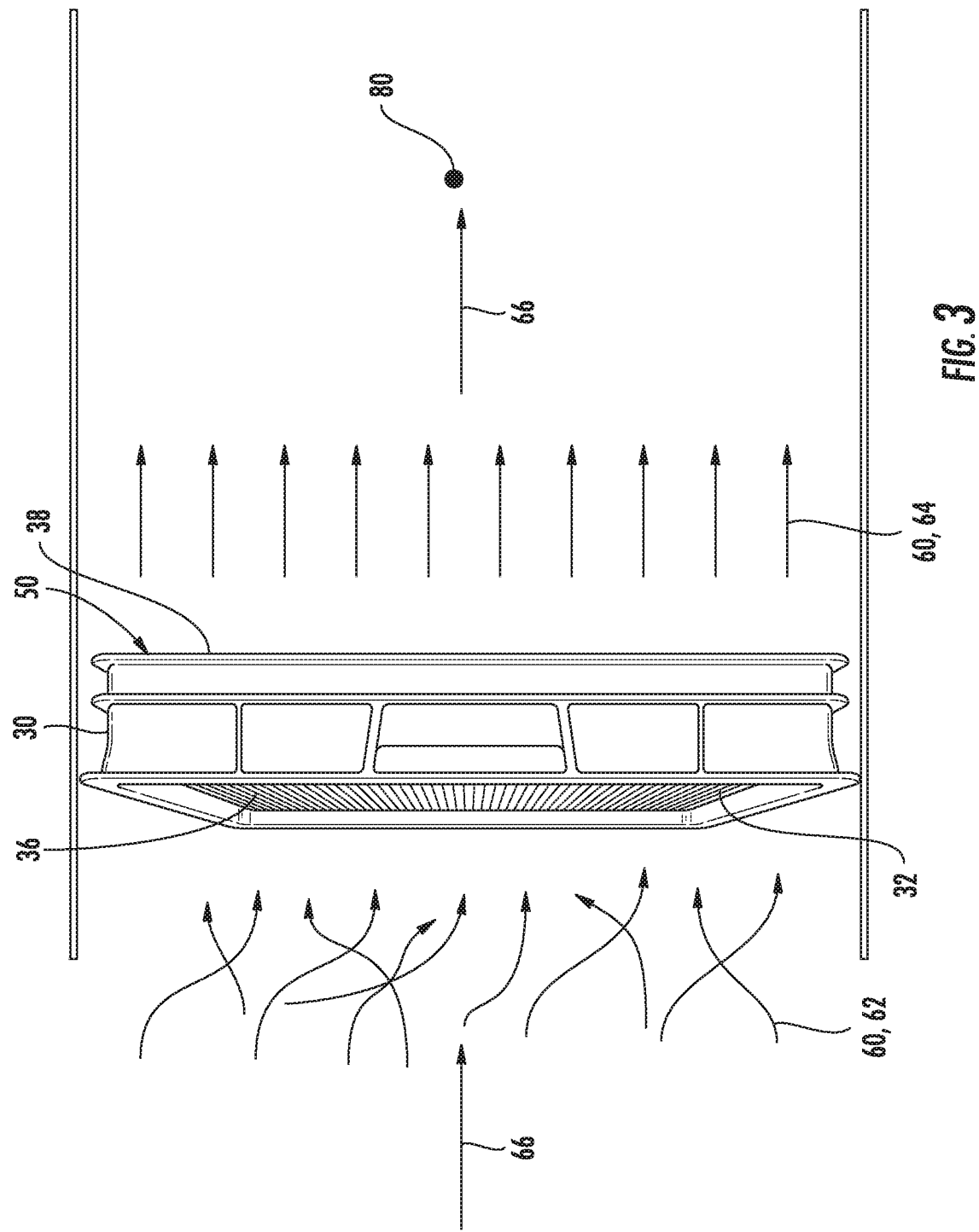
FIG. 3 is a schematic side view of air flowing through a filter media and a support frame that is attached to a conditioning device and upstream of a MAF sensor according to one embodiment.

The air flow conditioning device 50 is a restrictive device that rectifies or conditions the air stream 60 upstream up the MAF sensor 80 and in preparation for the air stream 60 to flow through the MAF sensor 80. More specifically, the conditioning device 50 is configured to condition the exit air flow 64 from the secondary filter media 32 after having been filtered by the secondary filter media 32 and before entering into the MAF sensor 80. As described further herein, the secondary filter media 32 creates disruptions and inconsistencies in the air stream 60 which affect the quality of the output of the MAF sensor 80 if the conditioning device 50 is not used. Accordingly, the conditioning device 50 creates a more uniform pressure drop or uniform pressure, creates a more uniform flow velocity profile, and/or straightens the air stream 60, as shown in FIGS. 2-3. Due to the configuration of the conditioning device 50, the conditioning device 50 is easily integrated or used within the filter assembly 20 and is low cost. The air flow conditioning device 50 may comprise, for example, an air flow rectifier or an air flow straightener.

In order to condition the exit air flow from the secondary filter media 32 before entering into the MAF sensor 80, the conditioning device 50 is positioned downstream of the clean side 38 of the secondary filter media 32 and upstream of the MAF sensor 80 along the flow direction 66 of the air flow duct of the air stream 60 (as shown in FIGS. 1C, 4, 5A, 6A, 8A-8E, and 9A-9B). Accordingly, the air stream 60 to be filtered flows through the secondary filter media 32 in the flow direction 66 and, after the air stream 60 passes through the secondary filter media 32, the air stream 60 passes through the conditioning device 50 (and subsequently passes through the MAF sensor 80).

The conditioning device 50 and the support frame 50 may be coupled together as separate components that are removably attachable to each other (such that the conditioning device 50 and the support frame 50 can be detached from each other without breaking or destroying any portion of the filter assembly 20) or integrally coupled together (as shown, for example, in FIGS. 8A-9B). For example, the conditioning device 50 and the support frame 30 may be formed together as one piece that cannot be separated without breaking or otherwise damaging at least one of the conditioning device 50 or the support frame 30.

As shown in the figures, the conditioning device 50 is coupled to the support frame 30 such that the conditioning device 50 and the support frame 30 are integrated together as one component. As described further herein, the conditioning device 50 is attached to the support frame 30 such that at least a portion of the upstream side 58 of the conditioning device 50 directly abuts the pleat tips on the clean side 38 of the secondary filter media 32 and there is no separation distance between the portion of the conditioning device 50 and the secondary filter media 32. This arrangement minimizes the required space within the filter assembly 20 for the conditioning device 50 and eliminates the need for a separate flow conditioning device.

Figure 4:
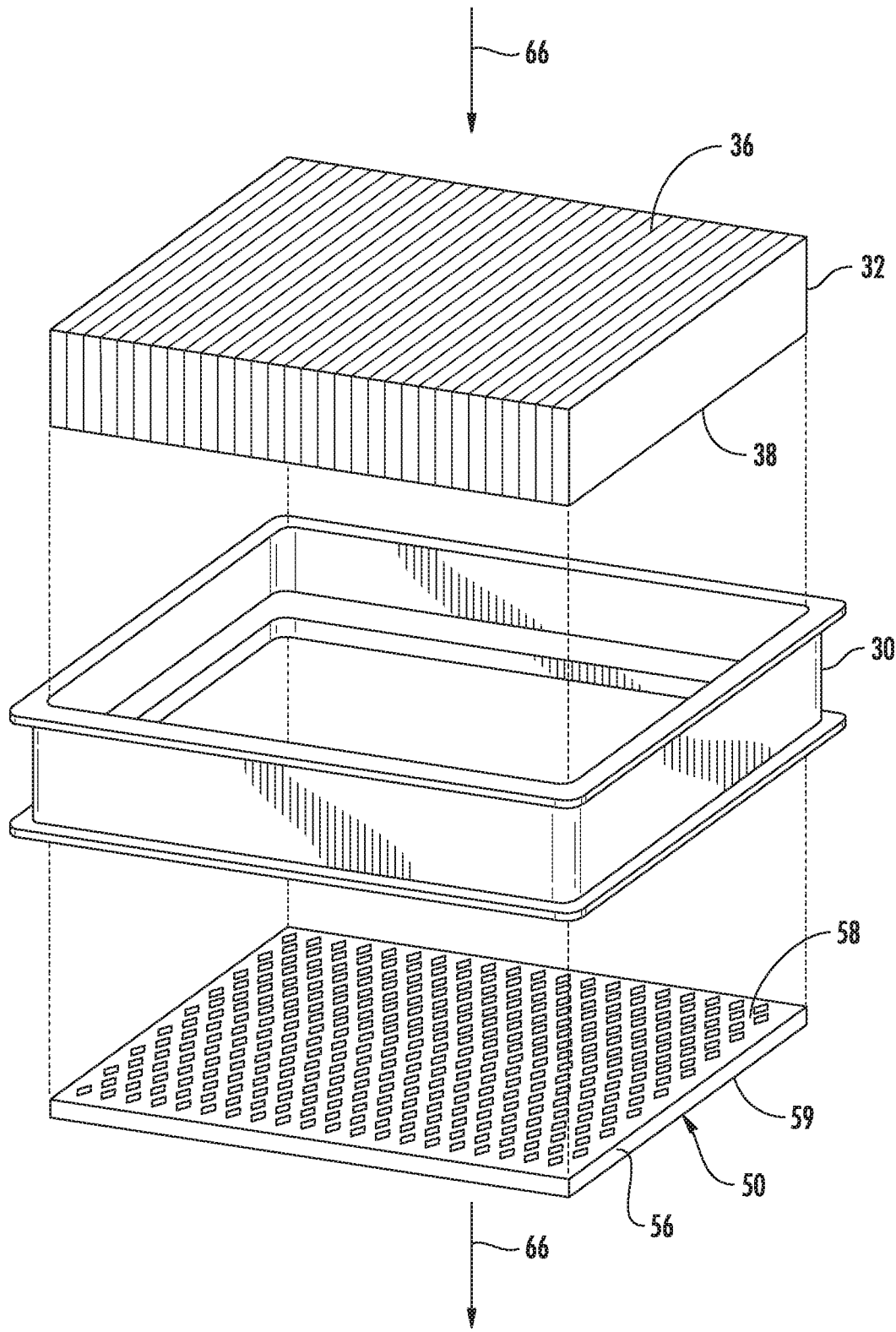
FIG. 4 is an exploded schematic view of a filter media, a support frame, and a conditioning device according to another embodiment.

As shown in FIG. 4, both the conditioning device 50 and the secondary filter media 32 fit within the inner perimeter of the support frame 30. However, it is understood that the conditioning device 50 may attach to an end of the support frame 30 (rather than within the perimeter of the support frame 30) and still directly abut at least a portion of the pleat tips on the clean side 38 of the secondary filter media 32.

The conditioning device 50 is placed into or onto, added onto, or molded into the support frame 30 within the filter assembly 20 at a location downstream of the secondary filter media 32. The conditioning device 50 may be statically attached to an existing support frame 30 through a variety of different methods or types of manufacturing, including but not limited to molding (e.g., over-molding) or adhesives (e.g., glue), which minimizes the cost of the conditioning device as well as the amount of required changes, modifications, tooling, and design. According to one embodiment, the conditioning device 50 (and the support frame 30) may be a plastic-molded structure. According to another embodiment, the conditioning device 50 may be adhered to, snapped onto, or welded (e.g., vibration welded) to an existing part of the support frame 30.

According to one embodiment, the conditioning device 50 may be added to a secondary filter media 32 and support frame 30 that are an existing Direct Flow™ filter and frame (such as the DF585 series) and are used in MAF sensor applications. According to another embodiment, the conditioning device 50 may be used with a secondary filter media 32 and support frame 30 that are within a circular duct.

In order to condition the air stream 60 for the MAF sensor 80, the conditioning device 50 includes a plate 56 that defines two phases, stages, surfaces, or sections that define several flow-straightening channels 52 and several holes 54 for the air stream 60 to flow through in order to properly condition the exit air flow 64, as shown in FIGS. 1C, 1D, 4-6B, and 8A-11B. The channels 52 are on or defined by a first surface of the plate 56, and the holes 54 are on or defined by a second surface of the plate 54. The first and second surfaces of the plate 54 are opposite each other along the direction of fluid flow through the plate 54. One of the first and second surfaces is along an upstream side of the plate 54 (and therefore the upstream side 58 of the conditioning device 50), and the other of the first and second surfaces is along a downstream side of the plate 54 (and therefore the downstream side 59 of the conditioning device 50).

As shown in FIGS. 5A-6B, the channels 52 and the holes 54 are in series with each other and are defined and positioned in the plate 56 such that there is no separation distance, clearance, or gaps between the channels 52 and the holes 54 along the flow direction 66. Accordingly, the air stream 60 flows directly between the channels 52 and the holes 54 (i.e., from the channels 52 into the holes 54 or from the holes 54 into the channels 52) and the plate 56 is a perforated plate.

The combination of the flow channels 52 and the holes 54 allows the conditioning device 50 to condition the air stream 60. A third section is not required for conditioning the air stream 60, would increase the cost and complexity of the filter assembly 20, and would be significantly more difficult to manufacture than having only two sections. According to one embodiment, the conditioning device 50 only includes the flow channels 52 and the holes 54 and does not include any other portions or areas for the air stream 60 to flow through (in series or in parallel with the flow channels 52 and the holes 54).

The conditioning device 50 comprises an upstream side 58 and a downstream side 59 that are opposite each other along the flow direction 66 of the air stream 60. The upstream side 58 directly abuts the clean side 38 of the secondary filter media 32 and the downstream side 59 is downstream of the upstream side 58 with respect to the flow direction 66 of the air stream 60. Depending on the orientation of the conditioning device 50 with respect to the secondary filter media 32, the channels 52 may be on the upstream side 58 and the holes 54 may be on the downstream side 59 or, conversely, the holes 54 may be on the upstream side 58 and the channels 52 may be on the downstream side 59.

For example, as shown in FIGS. 8B and 5A-6B, the channels 52 are upstream of the holes 54 (e.g., on the upstream side 58) and the holes 54 are therefore downstream of the channels 52 (e.g., on the downstream side 59). Accordingly, the section of the plate 56 that defines the channels 52 is adjacent or tangent to and directly abuts or contacts the pleat tips on the clean side 38 of the secondary filter media 32 (not shown in FIG. 8B). However, it is understood that, conversely, the holes 54 may be upstream of the channels 52 (e.g., on the upstream side 58) and therefore, the channels 52 may be downstream of the holes 54 (e.g., on the downstream side 59). Accordingly, the section of the plate 56 that defines the holes 54 is adjacent or tangent to and directly abuts or contacts the pleat tips on the clean side 38 of the secondary filter media 32.

Figure 12:
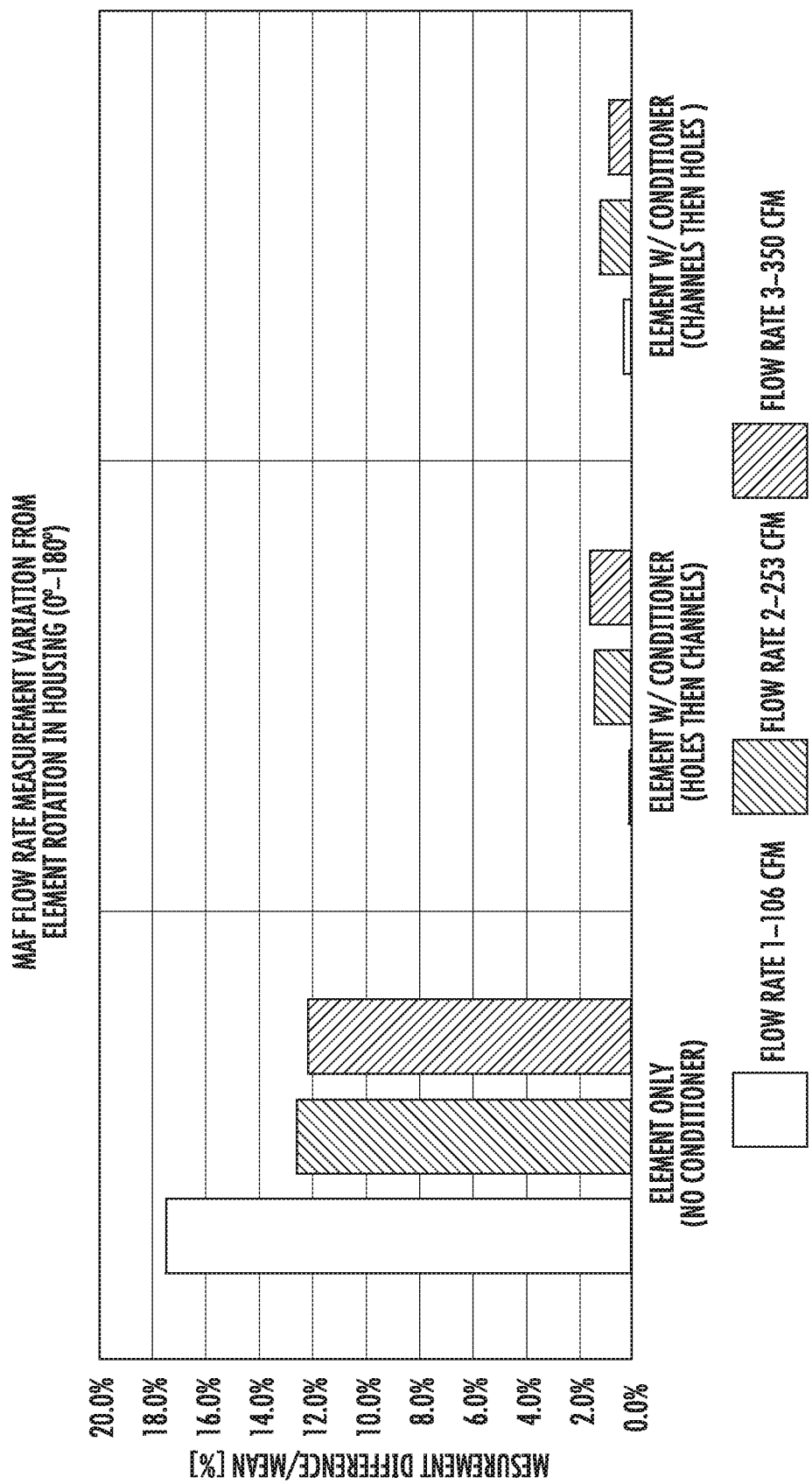
FIG. 12 is a graphical representation of MAF sensor flow rate measurement variation.

For example, FIG. 12 shows the quality of the MAF sensor output between three different configurations. More specifically, FIG. 12 provides a comparison between the flow rate measurement variation of A) the output of a MAF sensor with a secondary filter media and without any conditioning device, B) the output of a MAF sensor 80 with the secondary filter media 32 and the conditioning device 50 with the holes 54 first and then the channels 52 along the flow direction 66, and C) the output of a MAF sensor 80 with the secondary filter media 32 and the conditioning device 50 with the channels 52 first and then the holes 54 along the flow direction 66. Each of the three configurations depicts the flow rate measurement variation (as the measurement difference or mean percentage) with three different flow rates: 106 cubic feet per minute (cfm), 253 cfm, and 350 cfm. As shown, the quality of the output of the MAF sensor is dramatically improved when the conditioning device 50 is used. However, the quality of the output of the MAF sensor does not change significantly depending on whether the channels 52 or the holes 54 are positioned first along the flow direction 66.

As shown in FIGS. 8A-11B, the channels 52 and/or the holes 54 may be positioned in a grid-like pattern along either side of the conditioning device 50. The holes 54 and the channels 52 may have any cross-sectional shape, including, but not limited to, approximately a circle, square, triangle, star, hexagon, square with rounded edges, or any combination thereof.

Figure 8A:
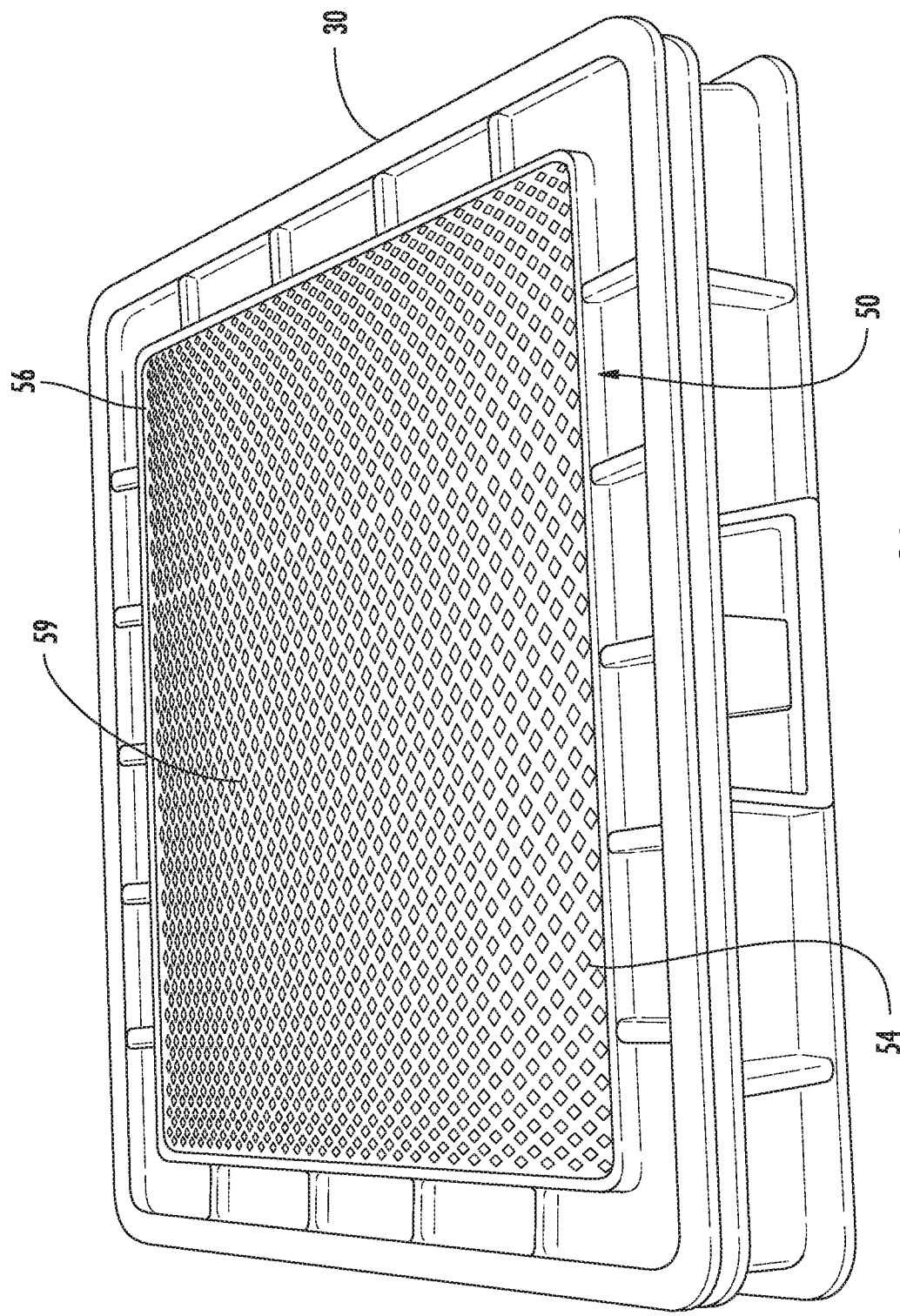
FIG. 8A is perspective view of a downstream side of a conditioning device and a support frame according to one embodiment.
Figure 8B:
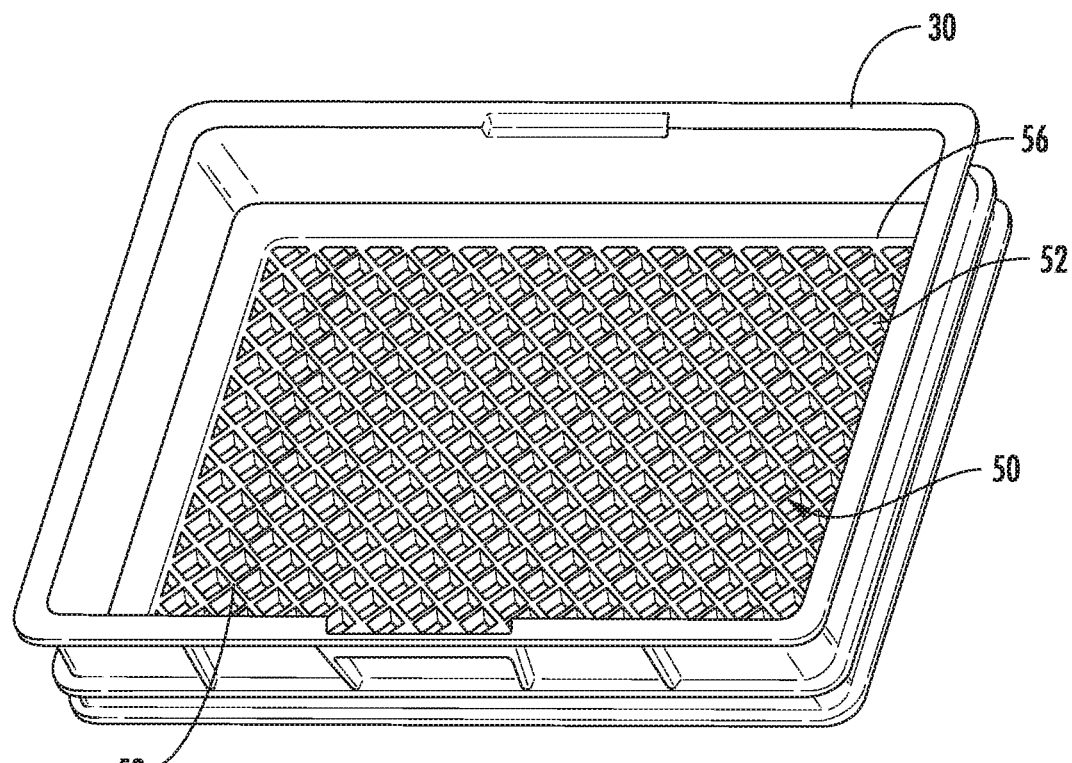
FIG. 8B is a perspective view of an upstream side of the conditioning device and the support frame of FIG. 8A.
Figure 8C:
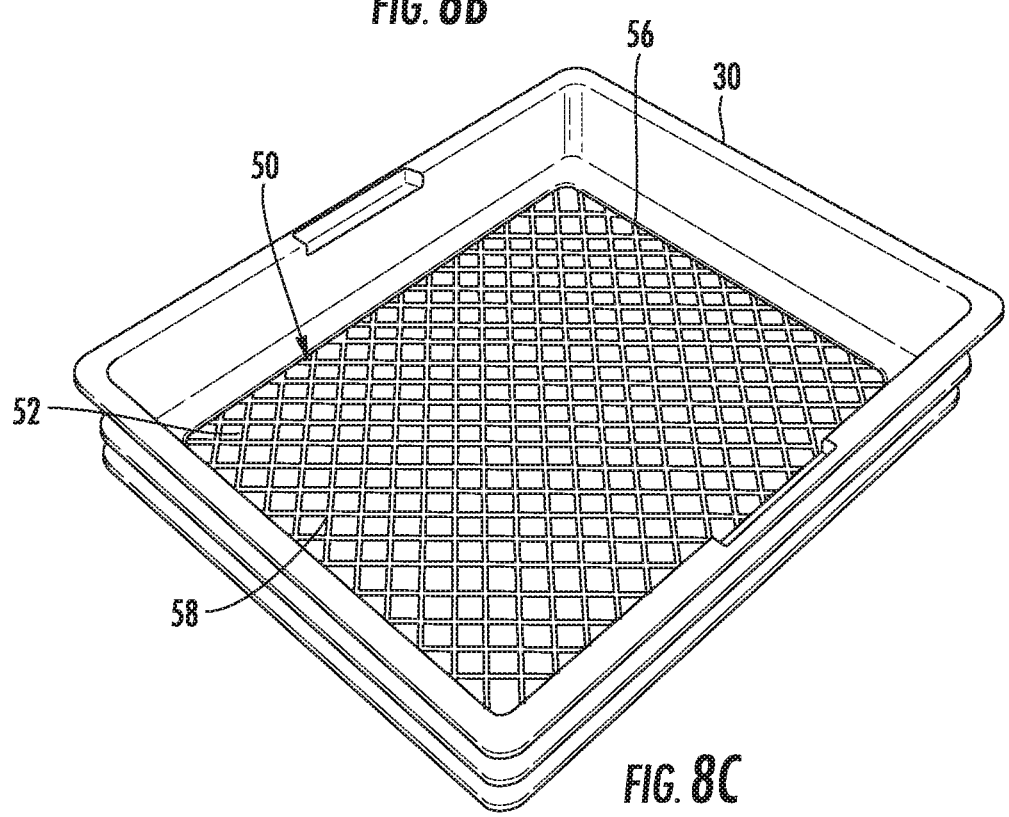
FIG. 8C is a perspective view of the upstream side of the conditioning device and the support frame of FIG. 8A.
Figure 8D:
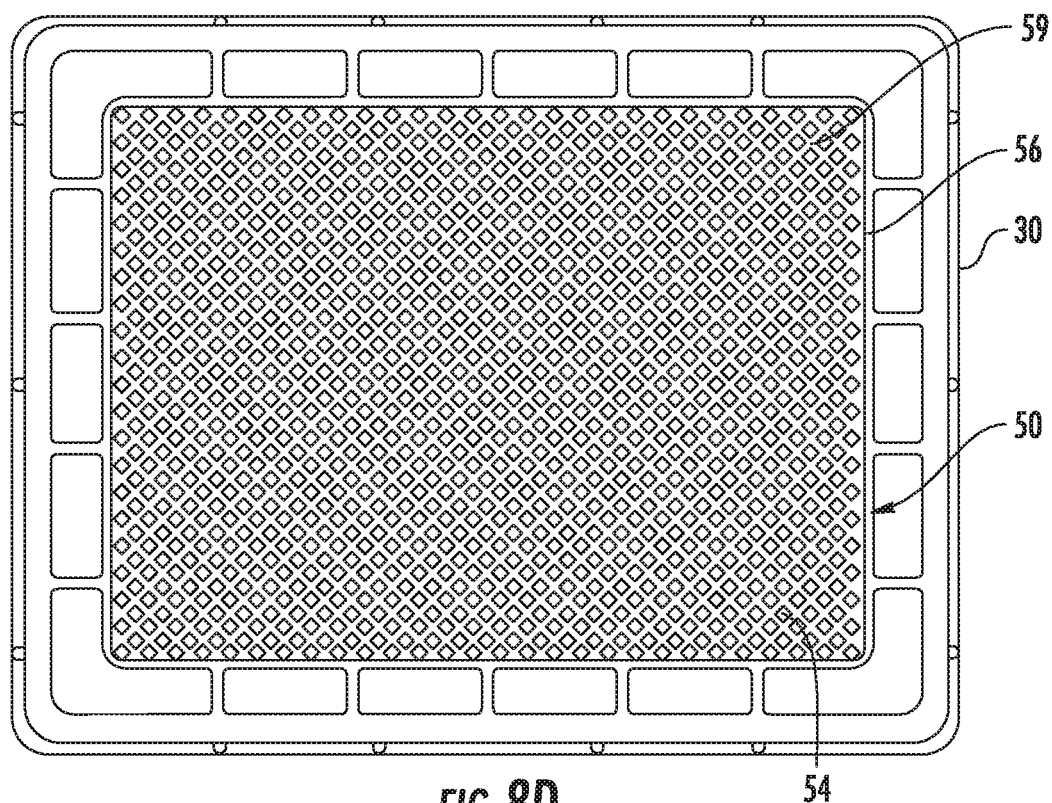
FIG. 8D is an elevation view of the downstream side of the conditioning device and the support frame of FIG. 8A.
Figure 8E:
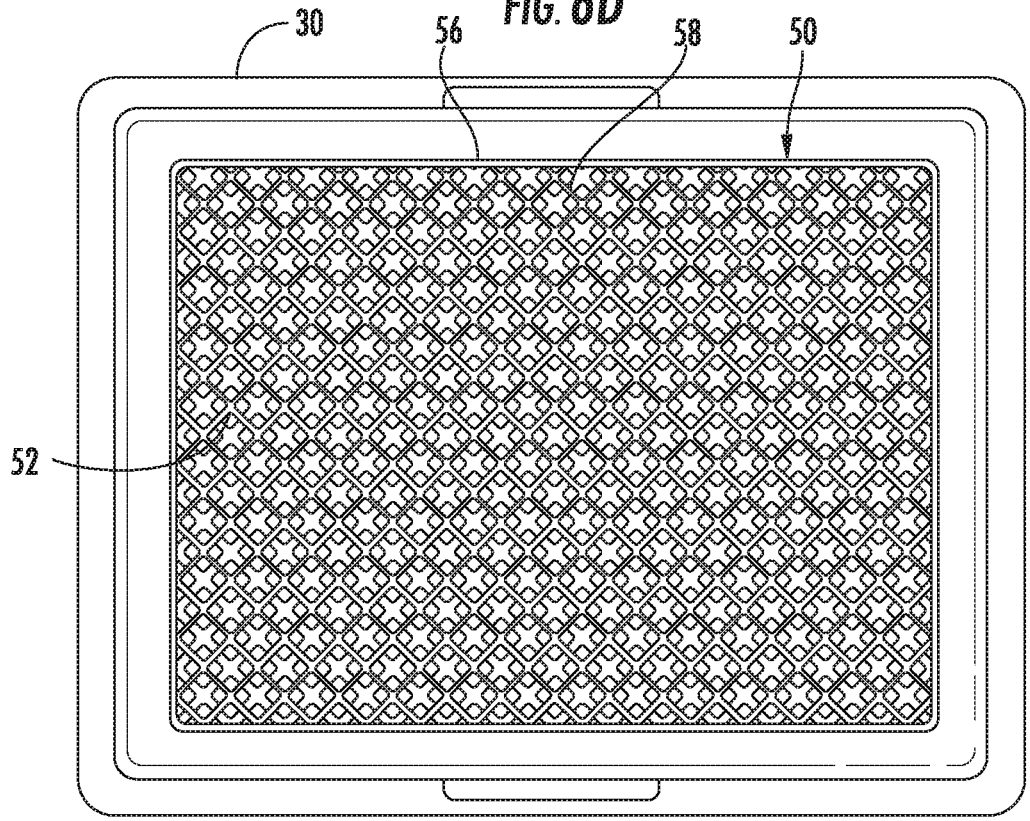
FIG. 8E is an elevation view of the upstream side of the conditioning device and the support frame of FIG. 8A.
Figure 8F:
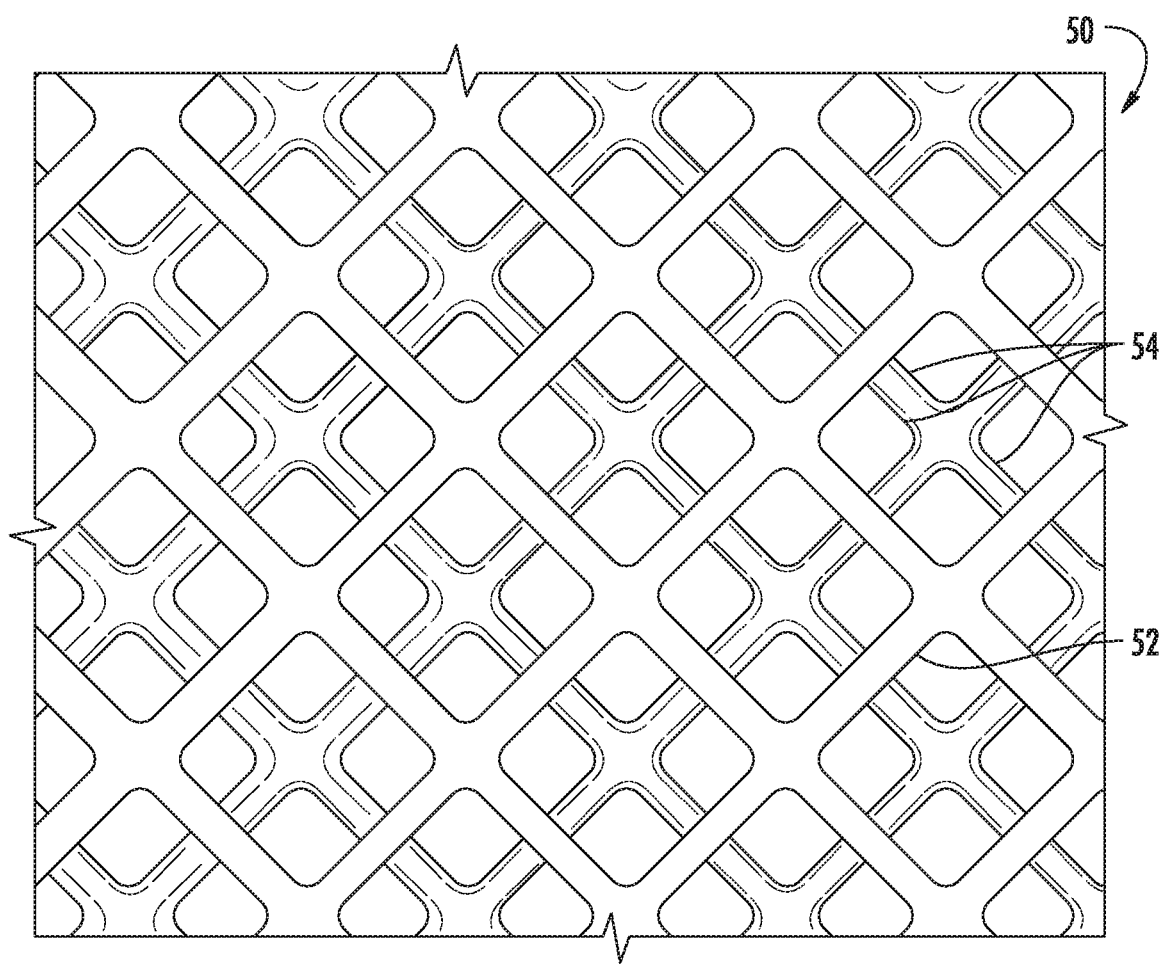
FIG. 8F is an enlarged view of a portion of the conditioning device of FIG. 8A.

As shown in FIGS. 8D-8F, the channels 52 and the holes 54 are sized differently compared to each other in cross-sectional area relative to the flow direction 66. The cross-sectional area refers to a measurement taken in a plane perpendicular to the flow direction 66 of the air stream 60. As shown in FIG. 8F, the more coarse section, the larger holes, or the flow-straightening channels 52 have a larger diameter or cross-sectional area than the holes 54. When viewed along the flow direction 66, the channels 52 encompass one or more of the smaller holes 54 (although it is noted that the channels 52 and the holes 54 are in series with each other along the flow direction 66). For example, as shown in FIG. 8F, one of the channels 52 encompasses four of the smaller holes 54 along the flow direction 66 (i.e., the cross-sectional area of the channel 52 is more than approximately four times the cross-sectional area of one of the holes 54) and the four smaller holes 54 are directly aligned with one of the channels 52. It is understood that the channels 52 and the holes 54 may or may not each have grooves or contours along their perimeters and surrounding each of the channels 52 and the holes 54.

The effectiveness of the conditioning device 50 may depend at least partially on the cross-sectional size of the holes 54 and the channels 52. Due to the smaller cross-sectional size of the more fine section or the smaller perforations, pores, or holes 54, the holes 54 may impact the effectiveness of the conditioning device 50 and the uniformity of the air stream 60 more significantly than the channels 52. According to one embodiment, the holes 54 have a maximum diameter or width (i.e., a measurement in a direction perpendicular to the flow direction 66) of approximately ten times or less the pleat spacing (e.g., the pleat-to-pleat distance) of the secondary filter media 32 in order to sufficiently condition the air stream 60. As used herein, the term "approximately" refers to +5% of the numerical provided.

According to one embodiment as shown in FIG. 10, the holes 54 and/or the channels 52 have different, non-uniform, or varying sizes and/or patterns along a plane perpendicular to the flow direction 66 and according to their respective locations along the plane (e.g., critical locations compared to non-critical locations along the plane of the conditioning device 50). The patterns and sizes of the channels 52 and the holes 54 may be specifically tuned in critical areas that are directly upstream of the MAF sensor 80. For example, in order to tune the performance of the MAF sensor 80, the sizes of the holes 54 (e.g., the cross-sectional areas) in a first section of the conditioning device 50 that is directly upstream of the window of the MAF sensor 80 are different than the sizes of the holes 54 (e.g., the cross-sectional areas) in a second section that is not directly upstream of the MAF sensor 80.

According to one embodiment as shown in FIG. 10, the holes 54 have at least two different cross-sectional areas when compared to each other (where the cross-sectional areas are taken in a plane perpendicular to the flow direction 66 of the air stream 60). For example, as shown in FIG. 10, the holes 54 in the center portion 78 of the plate 56 of the conditioning device 50 are smaller (e.g., have a smaller cross-sectional area and/or diameter) than the holes 54 in the edge portions 76 of the plate 56. The edge portions 76 are areas on either side of the center portion 78. This arrangement allows for the conditioning device 50 to have a lower overall restriction (due to the larger holes 54 in the edge portions 76) while still maintaining sufficient flow rectification for the MAF sensor 80 (due to the smaller holes 54 in the center portion 78). Additionally, the variation in the sizes of the holes 54 can be used to tune the response of the MAF sensor 80 to flow rate.

According to various embodiments, as shown for example in FIGS. 9A-9B, 10, and 11A, at least one hole 54, such as a series of holes 54, is blocked such that the air stream 60 cannot flow through at least one particular hole 54 in order to tune the air stream 60 and the performance of the MAF sensor 80, to introduce the correct amount of turbulence to the air stream 60, to change the uniformity of the air stream 60, and to reduce the signal variation of the MAF sensor 80. For example, the holes 54 include blocked holes 55 that do not allow fluid to flow through and open holes 57 that allow fluid to flow through. The holes 54 are optionally blocked off in at least one critical section, area, or flow window of the conditioning device 50 that is directly upstream of the MAF sensor 80 to tune the response of the MAF sensor 80 to the flow rate of the air stream 60. The blocked holes 55 may increase the restriction of the air stream 60 through the conditioning device 50. It is understood that, alternatively or additionally, at least one channel 52 may be blocked.

According to one embodiment, and as shown in FIGS. 9A-9B, 10, and 11A, four blocked holes 55 are positioned directly adjacent to each other, thus blocking an entire channel 52. Alternatively or additionally, four blocked holes 55 are grouped near each other (but are spaced apart from each other by one or two open holes 57), thus blocking a portion of different channels 52 (such as four adjacent channels 52).

The channels 52 and the holes 54 may also be sized differently compared to each other in depth or thickness relative to the flow direction 66. The depth or thickness refers to a measurement taken in a direction parallel to the flow direction 66. As shown in FIGS. 5A-6B, the channels 52 are relatively deeper or thicker than the holes 54 along the flow direction 66.

The depth of the channels 52 and the holes 54 together conditions or straightens the air stream 60. A conditioning device 50 with a higher thickness to diameter (i.e., width) ratio is more effective at conditioning the air stream 60. For example, according to one embodiment, the overall thickness (e.g., the depth or thickness of both the channels 52 and the holes 54 along the flow direction 66) of the conditioning device 50 is not less than the width of the smallest hole 54. Furthermore, according to one embodiment, the conditioning device 50 has at least a 1:1 ratio of conditioning device 50 depth (e.g., the depth of both the holes 54 and the channels 52 together) to hole 54 width (e.g., the width of the smallest hole 54) in order to straighten the air stream 60 and improve the quality and consistency of the signal of the MAF sensor 80. It is understood that the conditioning device 50 depth may be relatively greater than the hole 54 width depending on the material costs, space requirements, and desired performance. It is also understood that the depth of the holes 54 may be smaller than the width of the holes 54.

Figure 5A:
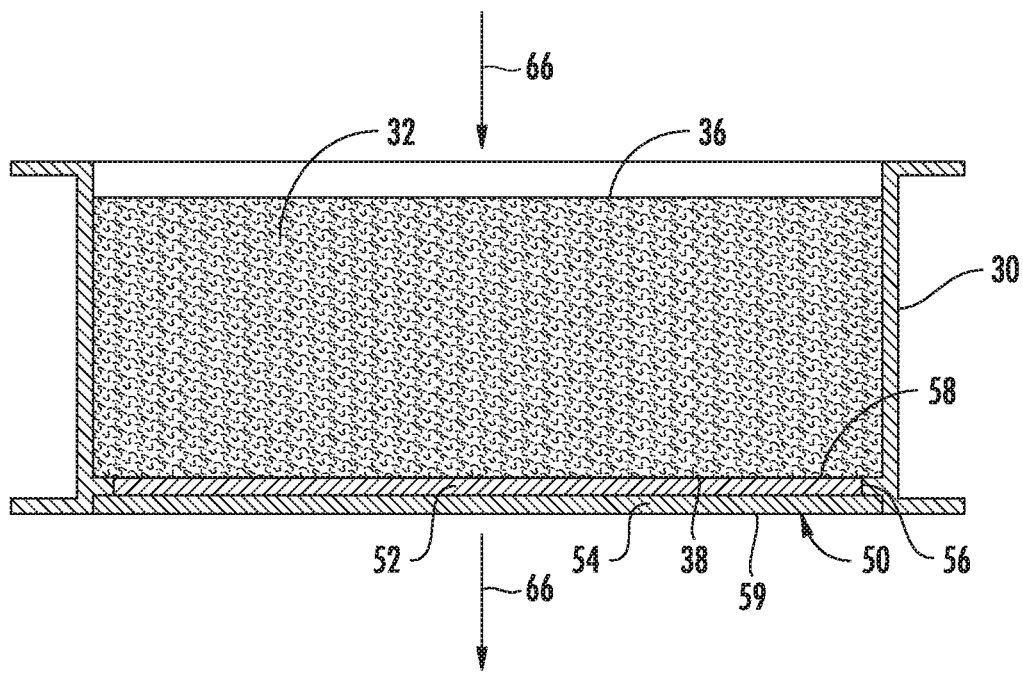
FIG. 5A is a cross-sectional view of a filter media, a support frame and a conditioning device according to yet another embodiment.
Figure 5B:
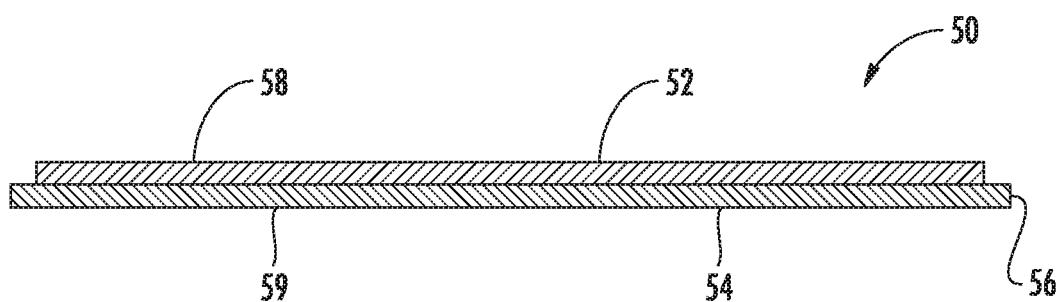
FIG. 5B is a cross-sectional view of the conditioning device of FIG. 5A.

The upstream side 58 of the conditioning device 50 directly contacts or abuts the clean side 38 of the secondary filter media 32. According to one embodiment as shown in FIGS. 5A-5B, the entire upstream side 58 of the conditioning device 50 directly abuts and contacts the pleat tips on the clean side 38 of the secondary filter media 32 such that there is no separation distance, clearance, or gap between the pleat tips of the secondary filter media 32 and the entire upstream side 58 of the conditioning device (i.e., the section of the plate 56 that defines one of the channels 52 and the holes 54). The conditioning device 50 does not require any separation distance (or a separation distance across the entire surface of the conditioning device 50) from the secondary filter media 32 in order to effectively condition the air stream 60. This arrangement is particularly beneficial in that, by directly contacting the secondary filter media 32, the filter pleats of the secondary filter media 32 are fully supported by the conditioning device 50 and no step between the conditioning device 50 and the secondary filter media 32 is required to create a gap. Otherwise, with a separation distance between the secondary filter media 32 and the conditioning device 50, the filter pleats may not be sufficiently supported and accordingly are prone to bending, which decreases the functionality, integrity, and efficiency of the secondary filter media 32.

According to another embodiment as shown in FIGS. 6A-6B, 9A, and 11B, only a portion of the upstream side 58 of the conditioning device 50 has a separation distance, clearance, or gap to the secondary filter media 32 at certain critical areas of the secondary filter media 32 (such as areas that are directly upstream of the MAF sensor 80) in order to increase the volume of the depth of the conditioning device 50 to even the pressure drop. For example, according to one embodiment, the upstream side 58 of the conditioning device 50 has at least one recessed portion 74 and at least one raised portion 72 in order to improve the performance of the MAF sensor 80 at critical locations directly upstream of the MAF sensor 80. The recessed portions 74 of the conditioning device 50 are recessed (relative to the raised portions 72) and therefore have less depth than the raised portions 72. Accordingly, the recessed portions 74 are spaced apart from the pleat tips on the clean side 38 of the secondary filter media 32, which creates a separation distance, clearance, or gap between the recessed portion 74 of the upstream side 58 of the conditioning device 50 and the pleat tips on the clean side 38 of the secondary filter media 32. Therefore, the recessed portions 74 do not directly contact or abut the secondary filter media 32.

The raised portions 72 of the conditioning device 50, however, directly abut and contact the pleat tips on the clean side 38 of the secondary filter media 32 and accordingly support the secondary filter media 32. The recessed portion 74 may be positioned in the center of the conditioning device 50 (e.g., between two raised portions 72 along the outside or edges of the conditioning device 50) in order to position the area of the conditioning device 50 with the separation distance in the center and directly upstream of the MAF sensor 80. However, it is understood that the conditioning device 50 does not require any separation distance to the secondary filter media 32.

Figure 6A:
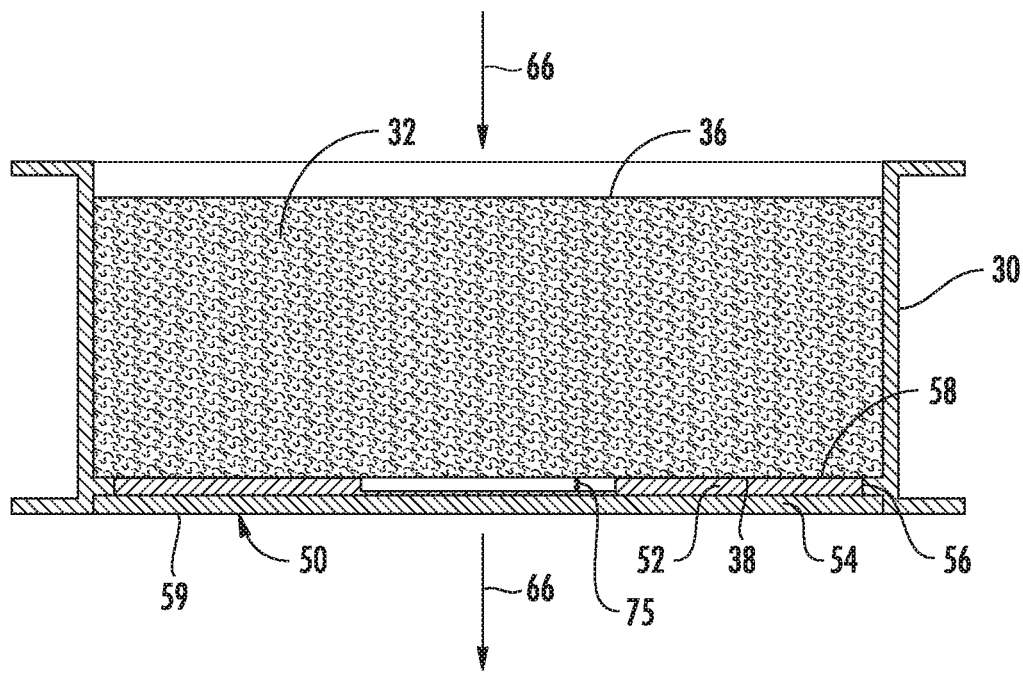
Figure 6B:
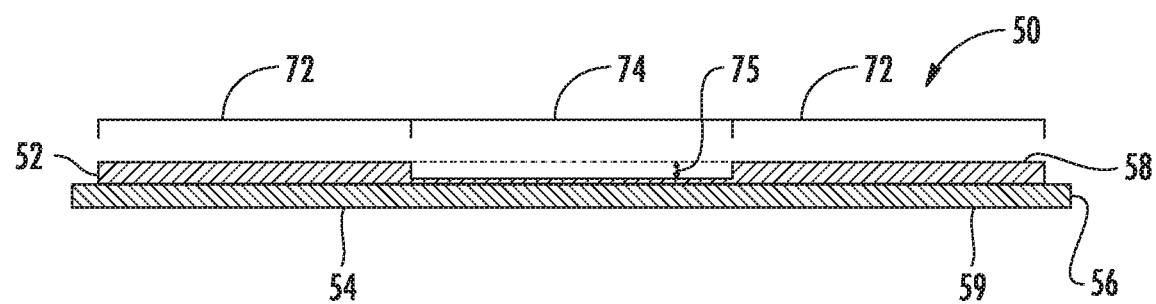
FIG. 6B is a cross-sectional view of the conditioning device of FIG. 6A.
Figure 9A:
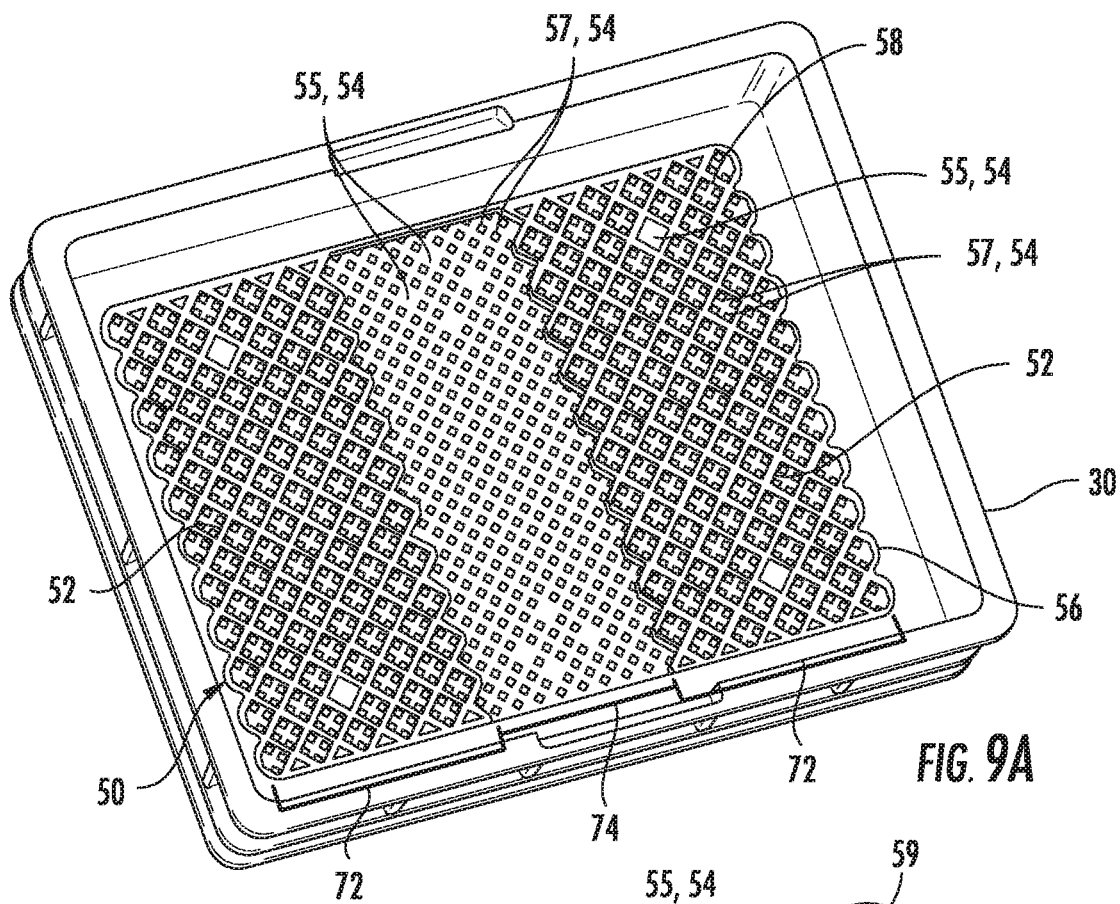
FIG. 9A is a perspective view of an upstream side of a conditioning device and a support frame according to another embodiment.
Figure 9B:
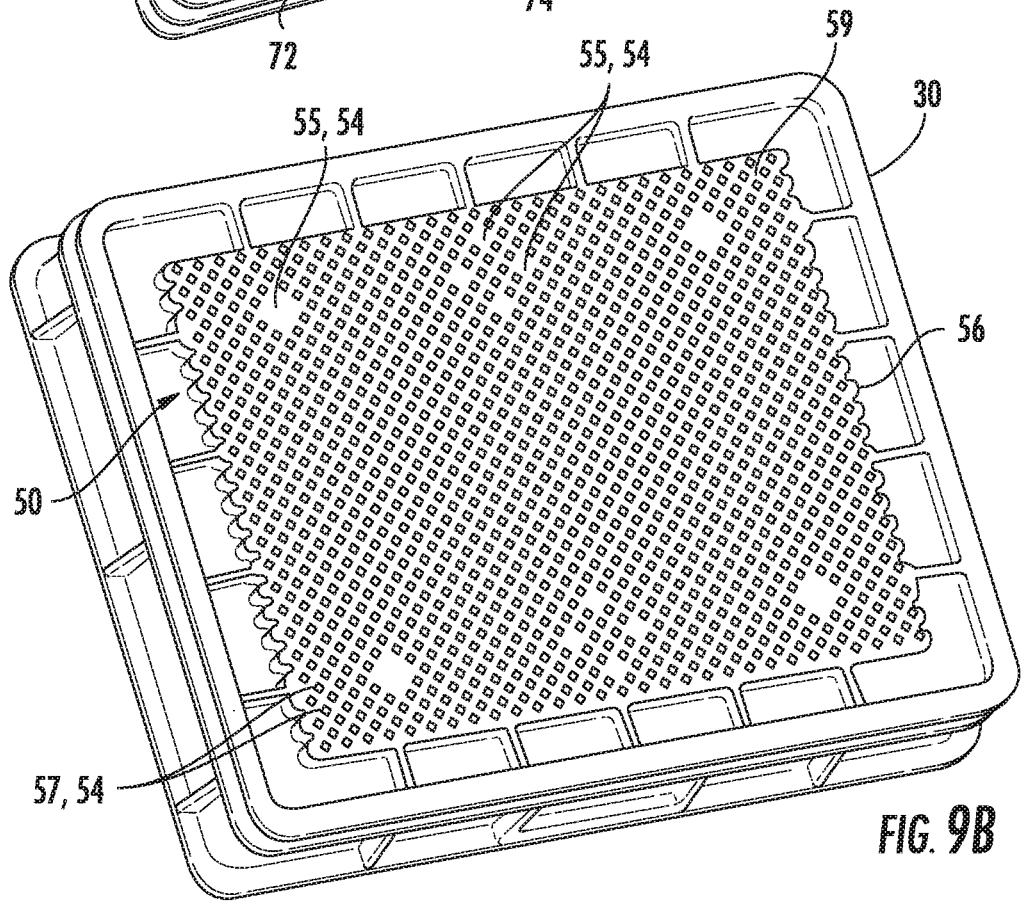
FIG. 9B is a perspective view of a downstream side of the conditioning device and the support frame of FIG. 9A.
Figure 11A:
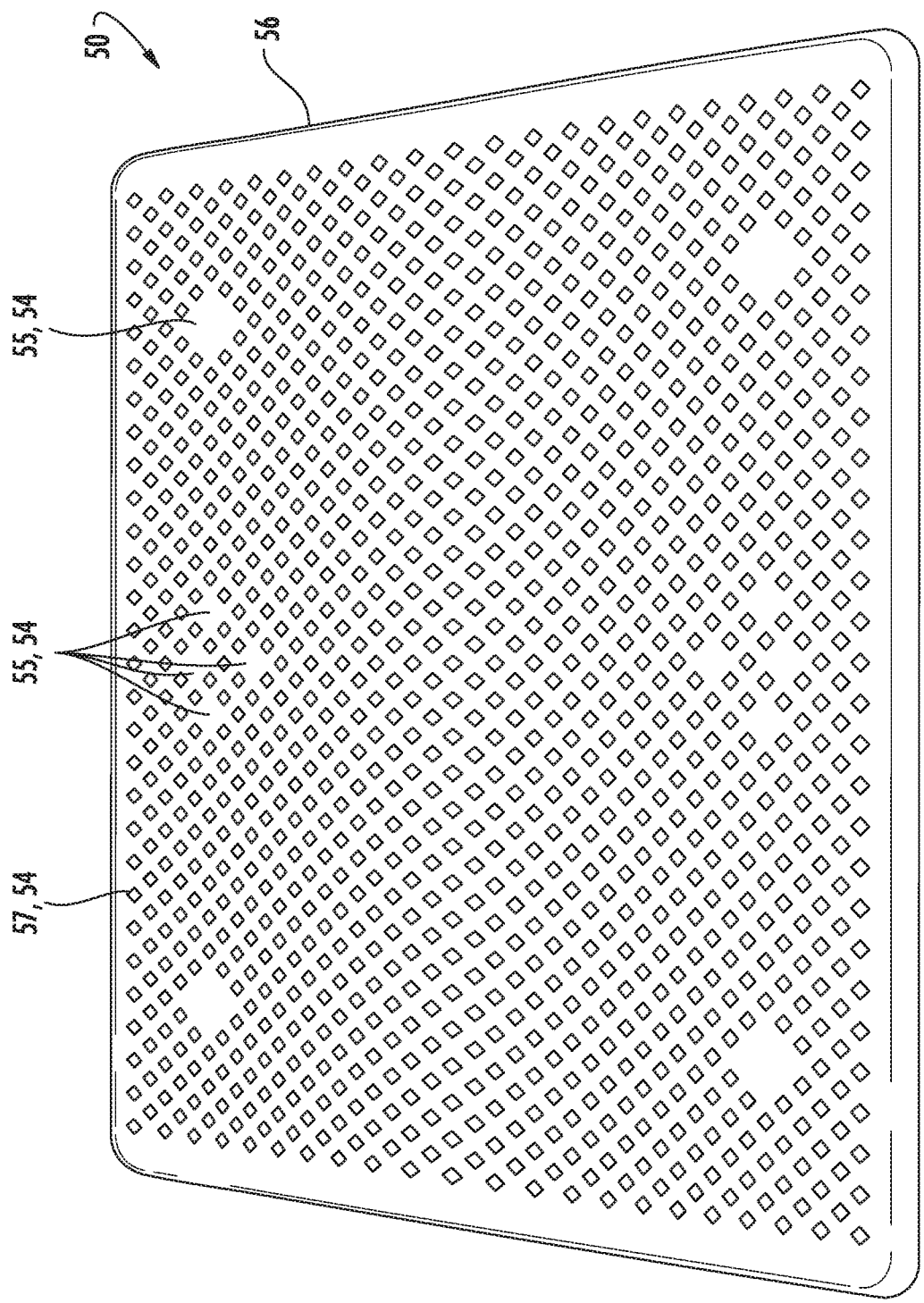
FIG. 11A is a perspective view of the holes on a conditioning device according to yet another embodiment.

As shown in FIGS. 6A-6B, the recessed portion 74 is a portion of the conditioning device 50 where the channels 52 are less deep or thick than in the raised portions 72. Alternatively or additionally, the holes 54 may be less deep or thick in the recessed portion 74. Alternatively, as shown in FIG. 9A, the recessed portion 74 of the conditioning device 50 does not have any channels 52.

The distance 75 between the recessed portion 74 and the pleat tips on the clean side 38 of the secondary filter media 32 is greater than zero. The distance 75 is on the order of or greater than the pleat-to-pleat distance (i.e., the pleat gap) of the secondary filter media 32. According to one embodiment, the distance 75 is between 0.1 times the pleat-to-pleat distance and 100 times the pleat-to-pleat distance. For example, if the pleat-to-pleat distance is 1 mm, the separation distance is approximately 0.1 mm. The distance 75 depends on specific application (e.g., dimension, geometry, etc.) and flow rate. In some arrangements, the distance 75 is approximately 0-10 mm. In more particular arrangements, the distance 75 is approximately 6-8 mm. Across some other arrangements, the distance 75 can vary from a fraction of a pleat-to-pleat distance of the secondary filter media 32 to 10 or 100 times of pleat-to-pleat distance.

The conditioning device 50 may be planar (i.e., flat) or slightly curved (e.g., concave or convex with respect to the flow direction 66). A slightly curved conditioning device 50 increases the area through which the air stream 60 flows through, thereby decreasing the face velocity and the pressure drop across the conditioning device 50.

Figure 13:
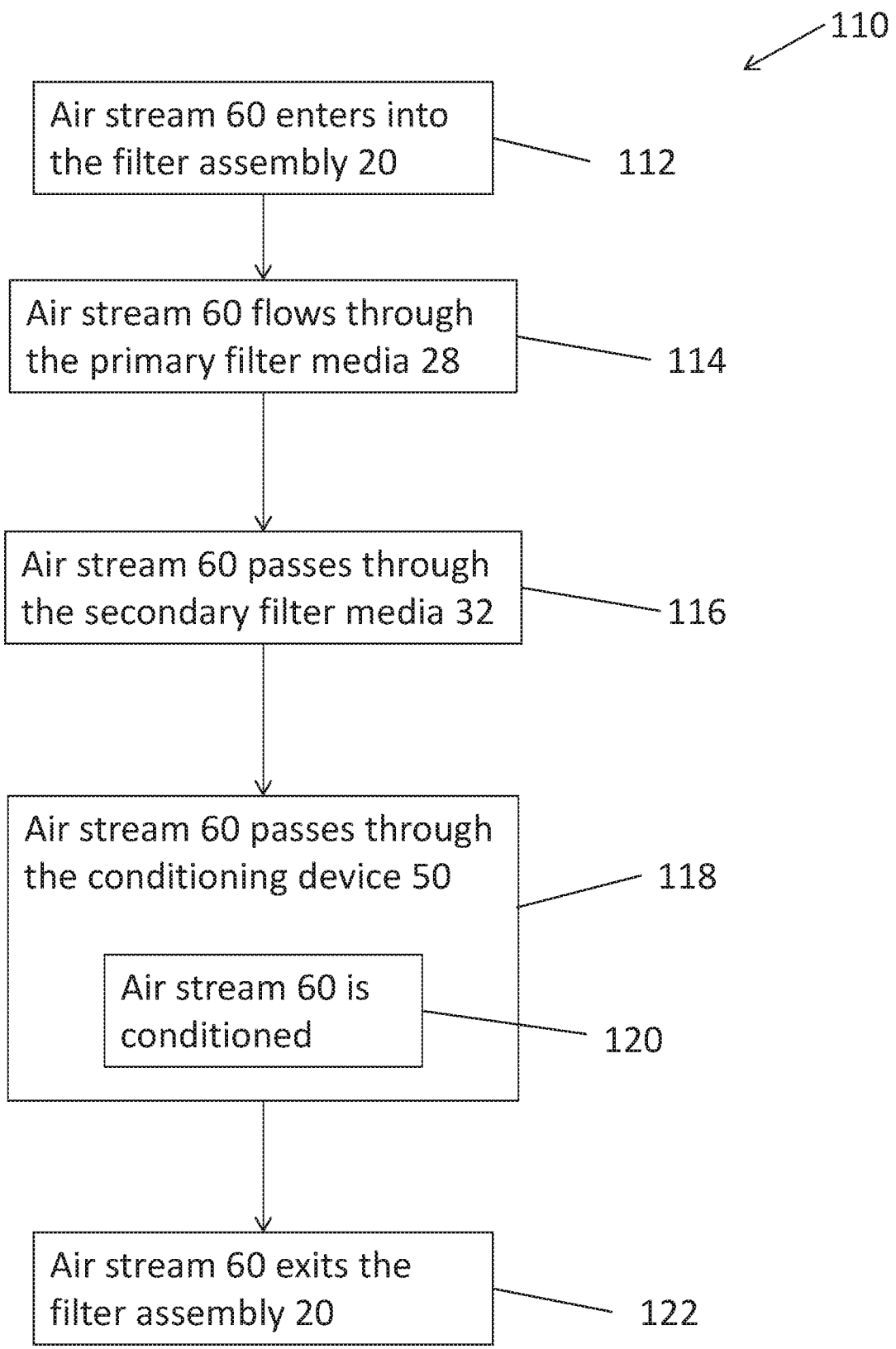
FIG. 13 is a flow diagram for a method of filtering and conditioning an air stream within a filter assembly according to one embodiment.

FIG. 13 shows one embodiment of a method (110) of filtering and conditioning the air stream 60 within the filter assembly 20 according to one embodiment. As shown, in order to filter and condition the air stream 60, the air stream 60 enters into the filter assembly 20 through the inlet 22 (112) and flows through the primary filter media 28 (114). As the air stream 60 passes through the primary filter media 28, the air stream 60 is filtered for a first time. The air stream 60 then passes through the secondary filter media 32 by flowing through the dirty side 36 of the secondary filter media 32 and then flowing through the clean side 38 of the secondary filter media 32 (116). As the air stream 60 passes through the secondary filter media 32, the air stream 60 is filtered for a second time. After the air stream 60 passes through the secondary filter media 32, the air stream 60 passes through the conditioning device 50 (118). As the air stream 60 passes through the conditioning device 50, the air stream 60 is conditioned and the air stream 60 is straightened by the conditioning device 50 (122). After the air stream 60 passes through the conditioning device 50, the air stream 60 flows by or through the MAF sensor 80 and then exits the air filter assembly 20 through the outlet 24 (122).

The functionality of the conditioning device 50 (e.g., how well the conditioning device 50 conditions the air stream 60) may depend at least partially on the K-factor. The K-factor of the conditioning device 50 is defined by equation 2 below.

$$K = \frac{\Delta p}{\frac{1}{2}\rho v^2} \qquad (2)$$

In equation 2, $\Delta p$ is the pressure drop caused by the conditioning device 50, $\rho$ is the density of the air, and v is the face velocity of the air stream 60 flowing through the secondary filter media 32. If the K-factor is zero, there is no pressure drop across the conditioning device 50 and therefore there is no flow conditioning. According to one embodiment, the minimum K-factor of the conditioning device 50 is approximately 1-10. According to another embodiment, the minimum K-factor is approximately 8. The maximum useful K-factor is estimated to be approximately 100 (beyond which, all allowed $\Delta p$ of entire filter assembly is consumed by the conditioning device alone). The K-factor is affected by the thickness of the conditioning device 50, the porosity (e.g., the ratio of air volume to solid volume) of the conditioning device 50, and the relative opening area of the plate 56.

Various factors impact the K-factor of the conditioning device 50. The K-factor depends primarily on the percentage of "open area" along the conditioning device 50 that the air stream 60 flows through (i.e., the total "hole area" divided by the total "plate area"), in addition to the cross-sectional size, thickness, pattern, and shape of the holes 54 and the channels 52, the arrangement of the holes 54 and the channels 52, and the thickness of the conditioning device 50. The pattern of the channels 52 and the holes 54 includes, for example, blocked holes 55 and/or varying sizes of holes 54 within the conditioning device 50. Specific impacts of the various configurations of the channels 52 and the holes 54 may be tested by a computational fluid dynamics (CFD) simulation. The CFD simulation is able to yield streamlines that wrap around the MAF sensor 80 and back trace these streamlines to determine which part of the conditioning device 50 these streamlines come from, which determines which part(s) on the conditioning device 50 is (are) significant to performance of the MAF sensor 80.

Due to the larger cross-sectional area of the channels 52, the channels 52 have a smaller K-factor than the holes 54 because the channels 52 are larger than the holes 54 and therefore the air stream 60 passes through the channels 52 with less resistance than through the holes 54. At the same time, the holes 54 have a higher K-factor than the channels 52 because the holes 54 are smaller than the channels 52 and therefore the air stream 60 passes through the holes 54 with more resistance. Therefore, the channels 52 lower the overall K-factor of the conditioning device 50 (compared to if only the holes 54 were used within the conditioning device 50), which significantly reduces the restriction of the conditioning device 50.

As utilized herein, the terms "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a support frame;
   a filter media coupled to the support frame, the filter media having a dirty side that receives an air stream and a clean side that outputs the air stream after having been filtered by the filter media; and
   a conditioning device coupled to the support frame, the conditioning device positioned downstream of the clean side of the filter media with respect to the air stream, the conditioning device directly contacting the clean side of the filter media,
   the conditioning device comprising a plate to condition the air stream, the plate comprising:
      a first plate section defining channels, the first plate section in contact with the filter media, and
      a second plate section in contact with the first plate section and downstream of the first plate section, the second plate section defining holes in series with the channels;
   wherein the channels are larger in cross-sectional area than the holes, the cross-sectional area taken in a plane perpendicular to a flow direction of the air stream; and
   wherein the condition device has an upstream side and a downstream side, the upstream side comprising at least one raised portion and a recessed portion.

2. The filter assembly of claim 1, wherein the upstream side directly abuts the clean side of the filter media and the downstream side is downstream of the upstream side with respect to a flow direction of the air stream.

3. The filter assembly of claim 2, wherein the entire upstream side of the conditioning device directly abuts the clean side of the filter media such that there is no gap between pleat tips on the clean side of the filter media and the entire upstream side of the conditioning device.

4. The filter assembly of claim 2, wherein the at least one raised portion directly contacts the clean side of the filter media and the recessed portion is spaced from the filter media such that the recessed portion does not directly contact the filter media and there is a gap between the recessed portion of the upstream side of the conditioning device and pleat tips on the clean side of the filter media.

5. The filter assembly of claim 4, wherein the upstream side of the conditioning device comprises two raised portions, the recessed portion positioned between the two raised portions along the center of the conditioning device.

6. The filter assembly of claim 1, wherein at least one of the holes is blocked such that the air stream cannot flow through the at least one of the holes.

7. The filter assembly of claim 1, wherein the holes have at least two different cross-sectional areas.

8. The filter assembly of claim 1, wherein a cross-sectional area of holes in a first section of the conditioning device that is directly upstream of a sensor within the filter assembly is different than a cross-sectional areas of holes in a second section of the conditioning device that is not directly upstream of the sensor.

9. The filter assembly of claim 7, wherein a cross-sectional area of the holes in a center portion of the plate of the conditioning device are smaller than a cross-sectional area of the holes in an edge portion of the plate of the conditioning device.

10. The filter assembly of claim 1, wherein a diameter of the holes is approximately ten times or less the pleat-to-pleat distance of the filter media.

11. The filter assembly of claim 1, wherein the holes have at least a 1:1 ratio of conditioning device depth to hole width.

12. The filter assembly of claim 1, wherein the channels are upstream of the holes such that a section of the plate defining each channel directly contacts the clean side of the filter media.

13. The filter assembly of claim 1, wherein there is no separation distance between the holes and the channels such that air flows directly between the channels and the holes.

14. The filter assembly of claim 1, wherein the flow conditioning device comprises an air flow rectifier.

15. The filter assembly of claim 1, wherein the flow conditioning device comprises an air flow straightener.

16. The filter assembly of claim 1, wherein the conditioning device conditions the air stream after having been filtered by the filter media.

17. The filter assembly of claim 1, further comprising a primary filter media, wherein the filter media is a secondary filter media that is downstream of the primary filter media within the filter assembly.

* * * * *